United States Patent
Raghavan et al.

(10) Patent No.: US 11,716,126 B2
(45) Date of Patent: *Aug. 1, 2023

(54) BEAM-BASED DETECTION FOR INTERFERENCE MITIGATION

(71) Applicant: QUALCOMM Incorporated, San Diego, CA (US)

(72) Inventors: Vasanthan Raghavan, West Windsor Township, NJ (US); Marco Papaleo, Bologna (IT); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,855

(22) Filed: Jan. 14, 2022

(65) Prior Publication Data

US 2022/0255595 A1 Aug. 11, 2022

Related U.S. Application Data

(63) Continuation of application No. 16/706,200, filed on Dec. 6, 2019, now Pat. No. 11,228,350.

(Continued)

(51) Int. Cl.
*H04W 4/00* (2018.01)
*H04B 7/0456* (2017.01)
(Continued)

(52) U.S. Cl.
CPC ......... *H04B 7/0456* (2013.01); *H04B 7/0617* (2013.01); *H04B 17/318* (2015.01);
(Continued)

(58) Field of Classification Search
CPC .. H04B 7/0456; H04B 7/0617; H04B 17/318; H04B 17/336; H04B 7/0695;
(Continued)

(56) References Cited

U.S. PATENT DOCUMENTS 8,543,063 B2 9/2013 Bergel et al.
9,820,165 B2 11/2017 Benjebbour et al.
(Continued)

FOREIGN PATENT DOCUMENTS

WO WO-2018171002 A1 9/2018

OTHER PUBLICATIONS

International Preliminary Report on Patentability—PCT/US2019/065188, The International Bureau of WIPO—Geneva, Switzerland, dated Jul. 29, 2021 (190989WO).
(Continued)

*Primary Examiner* — Helene E Tayong
(74) *Attorney, Agent, or Firm* — Danai Nelisile Mhembere; Holland & Hart LLP

(57) ABSTRACT

Methods, systems, and devices for wireless communications are described. The method includes receiving a transmission parameter of a second wireless network, scanning, based on the transmission parameter, for transmission activity of the second wireless network using a set of beams generated in (Continued)

accordance with a beamforming codebook, and opportunistically communicating with a second wireless device of the first wireless network using the beamforming codebook based on the scanning.

30 Claims, 17 Drawing Sheets

Related U.S. Application Data

(60) Provisional application No. 62/794,862, filed on Jan. 21, 2019.

(51) Int. Cl.
*H04B 7/06* (2006.01)
*H04W 72/044* (2023.01)
*H04B 17/336* (2015.01)
*H04W 24/10* (2009.01)
*H04B 17/318* (2015.01)
*H04W 72/0453* (2023.01)

(52) U.S. Cl.
CPC .......... *H04B 17/336* (2015.01); *H04W 24/10* (2013.01); *H04W 72/046* (2013.01); *H04W 72/0453* (2013.01)

(58) Field of Classification Search
CPC ................ H04B 7/0452; H04W 24/10; H04W 72/0453; H04W 72/046
USPC .......................................................... 370/329
See application file for complete search history.

(56) References Cited

U.S. PATENT DOCUMENTS

| | | | |
|---|---|---|---|
| 10,396,873 | B2 | 8/2019 | Guey et al. |
| 11,228,350 | B2 | 1/2022 | Raghavan et al. |
| 2010/0267341 | A1 | 10/2010 | Bergel et al. |
| 2014/0293858 | A1* | 10/2014 | Kalhan ............. H04W 36/0072 370/311 |
| 2014/0334473 | A1* | 11/2014 | Zhang .................. H04B 7/0626 370/338 |
| 2015/0003325 | A1 | 1/2015 | Sajadieh et al. |
| 2016/0099761 | A1 | 4/2016 | Chen et al. |
| 2017/0085127 | A1* | 3/2017 | Leabman ................ H02J 50/80 |
| 2018/0191422 | A1* | 7/2018 | Xia ....................... H04B 7/0695 |
| 2018/0198511 | A1 | 7/2018 | Maamari et al. |

OTHER PUBLICATIONS

International Search Report and Written Opinion—PCT/US2019/065188—ISA/EPO—dated Feb. 4, 2020 (190989WO).
ZTE, et al., "Discussion on Duplex and Interference Management", 3GPP Draft, 3GPP TSG RAN WG1 Meeting #87, R1-1612156—7.1.6.2 Duplex and Interfer Mangt, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016, XP051176108, pp. 1-10, Nov. 18, 2016 (Nov. 18, 2016), sections 2-3, Retrieved from the Internet: URL: http://www.3gpp.org/ftp/Meetings_3GPP_SYNC/RAN1/Docs/ [retrieved on Nov. 13, 2016].

* cited by examiner

BEAM-BASED DETECTION FOR INTERFERENCE MITIGATION

CROSS REFERENCE

The present Application for Patent is a Continuation of U.S. patent application Ser. No. 16/706,200 by RAGHAVAN et al., entitled "BEAM-BASED DETECTION FOR INTERFERENCE MITIGATION" filed Dec. 6, 2019, which claims the benefit of U.S. Provisional Patent Application No. 62/794,862 by RAGHAVAN et al., entitled "BEAM-BASED DETECTION FOR INTERFERENCE MITIGATION," filed Jan. 21, 2019, assigned to the assignee hereof, and expressly incorporated herein.

BACKGROUND

The following relates generally to wireless communications, and more specifically to beam-based detection for interference mitigation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, beamforming techniques may be used. With beamforming, rather than broadcasting a signal omnidirectionally in all directions, a base station or network access node may focus a signal in a directionally concentrated manner (e.g., via a beam) toward a UE. However, in some cases, beamforming techniques may be deficient in some circumstances due to overlapping signals or networks. Accordingly, wireless communications systems may benefit from improved beamforming techniques.

SUMMARY

The described techniques relate to improved methods, systems, devices, and apparatuses that support beam-based detection for interference mitigation. Generally, the described techniques provide for a UE in a mobile wireless network (e.g., at millimeter wave carrier frequencies) detecting the presence of a fixed services network (e.g., operating also at millimeter wave carrier frequencies), and taking steps to avoid interfering with the fixed services network communication. In some cases, a wireless device (e.g., a UE or base station) may receive a transmission parameter of a second wireless network and scan, based at least in part on the transmission parameter, for transmission activity of the second wireless network using a plurality of beams generated in accordance with a beamforming codebook. In some cases, the wireless device may opportunistically communicate with a second wireless device of the first wireless network using the beamforming codebook based at least in part on the scanning.

A method of wireless communication by a first wireless device of a first wireless network is described. The method may include receiving a transmission parameter of a second wireless network, scanning, based on the transmission parameter, for transmission activity of the second wireless network using a set of beams generated in accordance with a beamforming codebook, and opportunistically communicating with a second wireless device of the first wireless network using the beamforming codebook based on the scanning.

An apparatus for wireless communication by a first wireless device of a first wireless network is described. The apparatus may include a processor, memory in electronic communication with the processor, and instructions stored in the memory. The instructions may be executable by the processor to cause the apparatus to receive a transmission parameter of a second wireless network, scan, based on the transmission parameter, for transmission activity of the second wireless network using a set of beams generated in accordance with a beamforming codebook, and opportunistically communicate with a second wireless device of the first wireless network using the beamforming codebook based on the scanning.

Another apparatus for wireless communication by a first wireless device of a first wireless network is described. The apparatus may include means for receiving a transmission parameter of a second wireless network, scanning, based on the transmission parameter, for transmission activity of the second wireless network using a set of beams generated in accordance with a beamforming codebook, and opportunistically communicating with a second wireless device of the first wireless network using the beamforming codebook based on the scanning.

A non-transitory computer-readable medium storing code for wireless communication by a first wireless device of a first wireless network is described. The code may include instructions executable by a processor to receive a transmission parameter of a second wireless network, scan, based on the transmission parameter, for transmission activity of the second wireless network using a set of beams generated in accordance with a beamforming codebook, and opportunistically communicate with a second wireless device of the first wireless network using the beamforming codebook based on the scanning.

In some examples of the method, apparatuses, and non-transitory computer-readable medium described herein, scanning for transmission activity of the second wireless network further may include operations, features, means, or instructions for detecting transmission activity of the second wireless network within a first frequency band on a first beam of the set of beams.

In some examples of the method, apparatuses, and non-transitory computer-readable medium described herein, detecting the transmission activity of the second wireless network further may include operations, features, means, or instructions for detecting transmission activity of the second wireless network based on determining that a signal strength measurement generated using the first beam satisfies a threshold.

In some examples of the method, apparatuses, and non-transitory computer-readable medium described herein, opportunistically communicating with the second wireless device further may include operations, features, means, or instructions for communicating with the second wireless device via a second beam of the set of beams that differs from the first beam. In some examples, a peak or dominant array gain direction of the first beam may differ from a peak or dominant array gain direction of the second beam.

In some examples of the method, apparatuses, and non-transitory computer-readable medium described herein, opportunistically communicating with the second wireless device further may include operations, features, means, or instructions for transmitting a beam indicator that indicates the second beam to the second wireless device.

In some examples of the method, apparatuses, and non-transitory computer-readable medium described herein, opportunistically communicating with the second wireless device further may include operations, features, means, or instructions for communicating with the second wireless device via the second beam in a second frequency band that differs from the first frequency band.

In some examples of the method, apparatuses, and non-transitory computer-readable medium described herein, opportunistically communicating with the second wireless device further may include operations, features, means, or instructions for transmitting a frequency band indicator to the second wireless device that indicates the first frequency band, the second frequency band, or both. In some examples, the first frequency band may be a first contiguous or non-contiguous frequency band, and the second frequency band may be a second contiguous or non-contiguous frequency band.

In some examples of the method, apparatuses, and non-transitory computer-readable medium described herein, opportunistically communicating with the second wireless device further may include operations, features, means, or instructions for delaying communicating with the second wireless device based on the detecting.

In some examples of the method, apparatuses, and non-transitory computer-readable medium described herein, delaying communicating with the second wireless device further may include operations, features, means, or instructions for transmitting a time-delay indicator to the second wireless device.

In some examples of the method, apparatuses, and non-transitory computer-readable medium described herein, detecting the transmission activity of the second wireless network further may include operations, features, means, or instructions for detecting a fixed services link of the second wireless network based on the transmission parameter.

In some examples of the method, apparatuses, and non-transitory computer-readable medium described herein, detecting the transmission activity of the second wireless network further may include operations, features, means, or instructions for detecting a master information block or a system information block of the second wireless network based on the transmission parameter.

In some examples of the method, apparatuses, and non-transitory computer-readable medium described herein, the beamforming codebook corresponds to a first frequency band, the method further may include operations, features, means, or instructions for selecting a second beamforming codebook that corresponds to a second frequency band, and scanning the second frequency band for transmission activity of the second wireless network or a third wireless network using a second set of beams generated in accordance with the second beamforming codebook.

In some examples of the method, apparatuses, and non-transitory computer-readable medium described herein, the beamforming codebook provides the first wireless device with only a partial spherical coverage, and where opportunistically communicating with the second wireless device further may include operations, features, means, or instructions for delaying communicating with the second wireless device based on determining that a set of signal strength measurements generated using a respective beam of the set the beams does not satisfy a threshold. In some examples, the transmission parameter may indicate the threshold.

In some examples of the method, apparatuses, and non-transitory computer-readable medium described herein, the beamforming codebook provides the first wireless device with a partial spherical coverage, and where opportunistically communicating with the second wireless device further may include operations, features, means, or instructions for communicating with the second wireless device based on determining that at least one signal strength measurement generated using at least one beam of the set the beams satisfies a threshold.

In some examples of the method, apparatuses, and non-transitory computer-readable medium described herein, the first wireless network is a Fifth Generation New Radio (5G-NR) wireless network at millimeter wave carrier frequencies and the second wireless network is a fixed services wireless network at millimeter wave carrier frequencies. In some examples, the transmission parameter may indicate a waveform type used in the second wireless network, a duration over which to scan for transmission activity, a beamwidth to use for scanning for transmission activity, or any combination thereof.

In some examples of the method, apparatuses, and non-transitory computer-readable medium described herein, the transmission parameter may indicate a detection threshold to use when scanning for transmission activity. In some examples, the detection threshold may be a signal to noise ratio threshold, a signal to interference plus noise ratio, an energy threshold, or a received power threshold. In some examples, the detection threshold may be based at least in a part on a defined false alarm rate or a defined misdetection rate, or a tradeoff between false alarms and misdetections.

In some examples of the method, apparatuses, and non-transitory computer-readable medium described herein, the plurality of beams generated in accordance with the codebook may provide the first wireless device with spherical coverage for signal reception over channel clusters in different directions over an entire sphere. In some examples, the first wireless device may be a base station, a user equipment, a backhaul node, or a point to point wireless device.

A method of wireless communication by a first wireless device of a first wireless network is described. The method may include transmitting a parameter request to a second wireless device of a second wireless network, receiving a transmission parameter based on the parameter request, configuring a UE to scan, based on the transmission parameter, for transmission activity of the second wireless network using a set of beams generated in accordance with a beamforming codebook, and opportunistically communicating with the UE using the beamforming codebook.

An apparatus for wireless communication by a first wireless device of a first wireless network is described. The apparatus may include a processor, memory in electronic communication with the processor, and instructions stored in the memory. The instructions may be executable by the processor to cause the apparatus to transmit a parameter request to a second wireless device of a second wireless network, receive a transmission parameter based on the parameter request, configure a UE to scan, based on the transmission parameter, for transmission activity of the second wireless network using a set of beams generated in accordance with a beamforming codebook, and opportunistically communicate with the UE using the beamforming codebook.

Another apparatus for wireless communication by a first wireless device of a first wireless network is described. The apparatus may include means for transmitting a parameter request to a second wireless device of a second wireless network, receiving a transmission parameter based on the parameter request, configuring a UE to scan, based on the transmission parameter, for transmission activity of the second wireless network using a set of beams generated in accordance with a beamforming codebook, and opportunistically communicating with the UE using the beamforming codebook.

A non-transitory computer-readable medium storing code for wireless communication by a first wireless device of a first wireless network is described. The code may include instructions executable by a processor to transmit a parameter request to a second wireless device of a second wireless network, receive a transmission parameter based on the parameter request, configure a UE to scan, based on the transmission parameter, for transmission activity of the second wireless network using a set of beams generated in accordance with a beamforming codebook, and opportunistically communicate with the UE using the beamforming codebook.

In some examples of the method, apparatuses, and non-transitory computer-readable medium described herein, opportunistically communicating with the UE further may include operations, features, means, or instructions for receiving a beam indicator indicating a first beam of the set of beams may have been selected by the UE, and communicating with the UE using a second beam that corresponds to the first beam.

In some examples of the method, apparatuses, and non-transitory computer-readable medium described herein, opportunistically communicating with the UE further may include operations, features, means, or instructions for receiving a frequency band indicator from the UE that indicates a first frequency band, a second frequency band, or both, and communicating with the UE based on the frequency band indicator. In some examples, the first frequency band may be a first contiguous or non-contiguous frequency band, and the second frequency band may be a second contiguous or non-contiguous frequency band In some examples of the method, apparatuses, and non-transitory computer-readable medium described herein, opportunistically communicating with the UE further may include operations, features, means, or instructions for receiving a delay indicator from the UE, and delaying communicating with the UE based on the delay indicator.

In some examples of the method, apparatuses, and non-transitory computer-readable medium described herein, the first wireless network may be a Fifth Generation New Radio (5G-NR) wireless network at millimeter wave carrier frequencies and the second wireless network may be a fixed services wireless network at millimeter wave carrier frequencies.

In some examples of the method, apparatuses, and non-transitory computer-readable medium described herein, the transmission parameter may indicate a waveform type used in the second wireless network, a duration over which to scan for transmission activity, a beamwidth to use for scanning for transmission activity, or any combination thereof. In some examples, the transmission parameter may indicate a detection threshold to use when scanning for transmission activity. In some examples, the detection threshold may be a signal to noise ratio threshold, a signal to interference plus noise ratio, an energy threshold, or a received power threshold. In some examples, the detection threshold may be based at least in a part on a defined false alarm rate or a defined misdetection rate, or a tradeoff between false alarms and misdetections.

In some examples of the method, apparatuses, and non-transitory computer-readable medium described herein, the plurality of beams generated in accordance with the codebook may provide the UE with spherical coverage for signal reception over channel clusters in different directions over an entire sphere. In some examples, the first wireless device may be a base station, a backhaul node, or a point to point wireless device.

DETAILED DESCRIPTION

Figure 1:
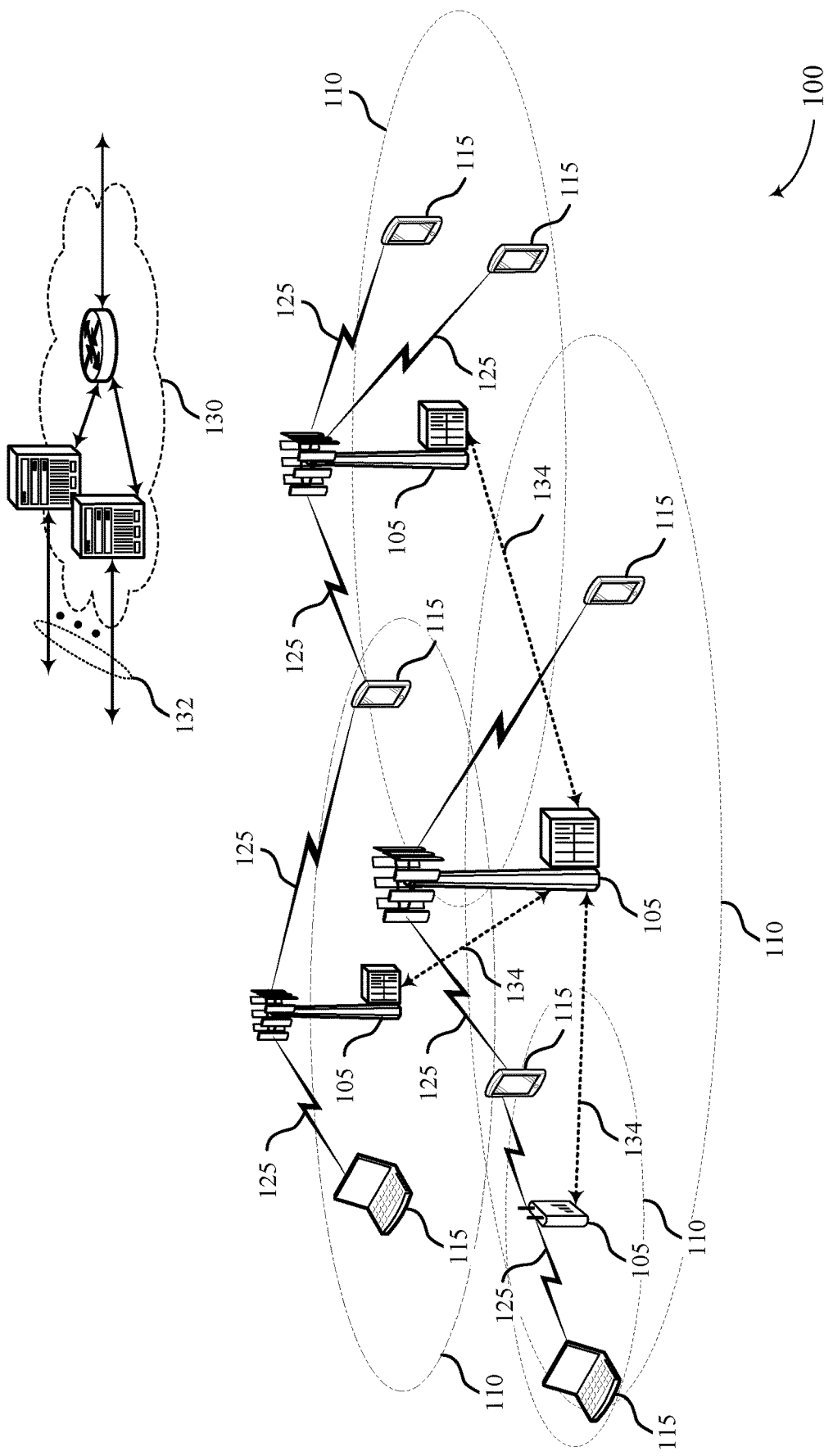
FIG. 1 illustrates an example of a system for wireless communications in accordance with aspects of the present disclosure.

In some cases, spectrum in some bands (e.g., millimeter wave band, etc.) may include overlapping allocations. For example, allocations for mobile services may overlap with allocations for fixed services (e.g., fixed wireless connections, wireless Internet Service Providers (WISPs), satellite connections, etc.) resulting in fixed services potentially interfering with mobile services. Examples of fixed service networks may include individual towers that provide (e.g., predominantly provide) line of sight (LOS) service to customers as opposed to mobile services (e.g., cellular wireless services) where the customer devices may remain connected while being mobile (e.g., not necessarily within LOS of a tower).

To avoid interference, a separation in frequency use may be implemented (e.g., a mobile service network avoiding transmissions in fixed services bands, etc.), or coordination between a fixed service network and a mobile service network may be implemented. In some cases, separation in frequency use may include avoiding fixed service channels in some locations by not assigning relatively wide contiguous blocks to a mobile service operator while operating in those some locations. However, separation in frequency use may result in an inefficient use of the overlapping frequency bands (e.g., available spectral resources may not be efficiently or fully utilized). However, in those locations with fixed services, not all the spectral bands are allocated for fixed services. Accordingly, the present techniques may include detection mechanisms for detecting channel allocations to fixed services.

The present techniques relate to a UE in a wireless cellular network detecting the presence of a fixed services network, and taking steps to avoid interfering with the fixed services network communication. In some cases, a UE may include a beamforming codebook and may scan for fixed services network communication using the beams indicated in the codebook looking for fixed services network transmission activity (e.g., fixed services network transmissions are currently ongoing within one or more frequency bands). In some cases, a base station may coordinate with a fixed services network to obtain a parameter that improves the ability of the UE to detect fixed services network communication (e.g., a waveform type used by the fixed services network). Based on whether the UE detected fixed services network transmission activity, the UE may select which beam it uses, may delay (e.g., in time) the use of a particular beam or frequency band, or may avoid using a frequency band altogether. In some cases, the UE may opportunistically communicate with a base station based on whether fixed services transmission activity is detected. In some cases, a base station may perform virtually the same operations of detecting fixed services transmission activity to opportunistically communicate with the UE.

In some examples, the present techniques may include a mobile service device (e.g., a user equipment, base station, a backhaul node, etc.) configured to detect fixed service links (e.g., detect when and where fixed service links exist). In one example, a mobile service network may be configured to detect channelizations allocated for fixed services. In some cases, mobile service networks of the present techniques may be configured to opportunistically transmit/receive with contiguous or non-contiguous carrier aggregation schemes when there are no detected fixed service allocations. In some cases, the mobile service networks of the present techniques may be configured to leverage beam-based detection schemes in the millimeter wave band for efficient use of the spectrum Aspects of the disclosure are initially described in the context of a wireless communications system. Aspects of the disclosure are further illustrated by and described with reference to wireless communications subsystems, wireless spectrums, and process flows. Aspects of the disclosure are further illustrated by and described with reference to apparatus diagrams, system diagrams, and flowcharts that relate to beam-based detection for interference mitigation.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples, (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In one example, a device (e.g., UE 115 or base station 105) may perform beam-based detection for interference mitigation. For example, a device (e.g., UE 115 or base station 105) may receive a transmission parameter of a second wireless network and scan, based at least in part on the transmission parameter, for transmission activity of the second wireless network using one or more beams. In some cases, the one or more beams may be generated in accordance with a beamforming codebook. Additionally or alternatively, a device (e.g., UE 115 or base station 105) may communicate with a second wireless device of the first wireless network using the beamforming codebook based at least in part on the scanning.

Figure 2:
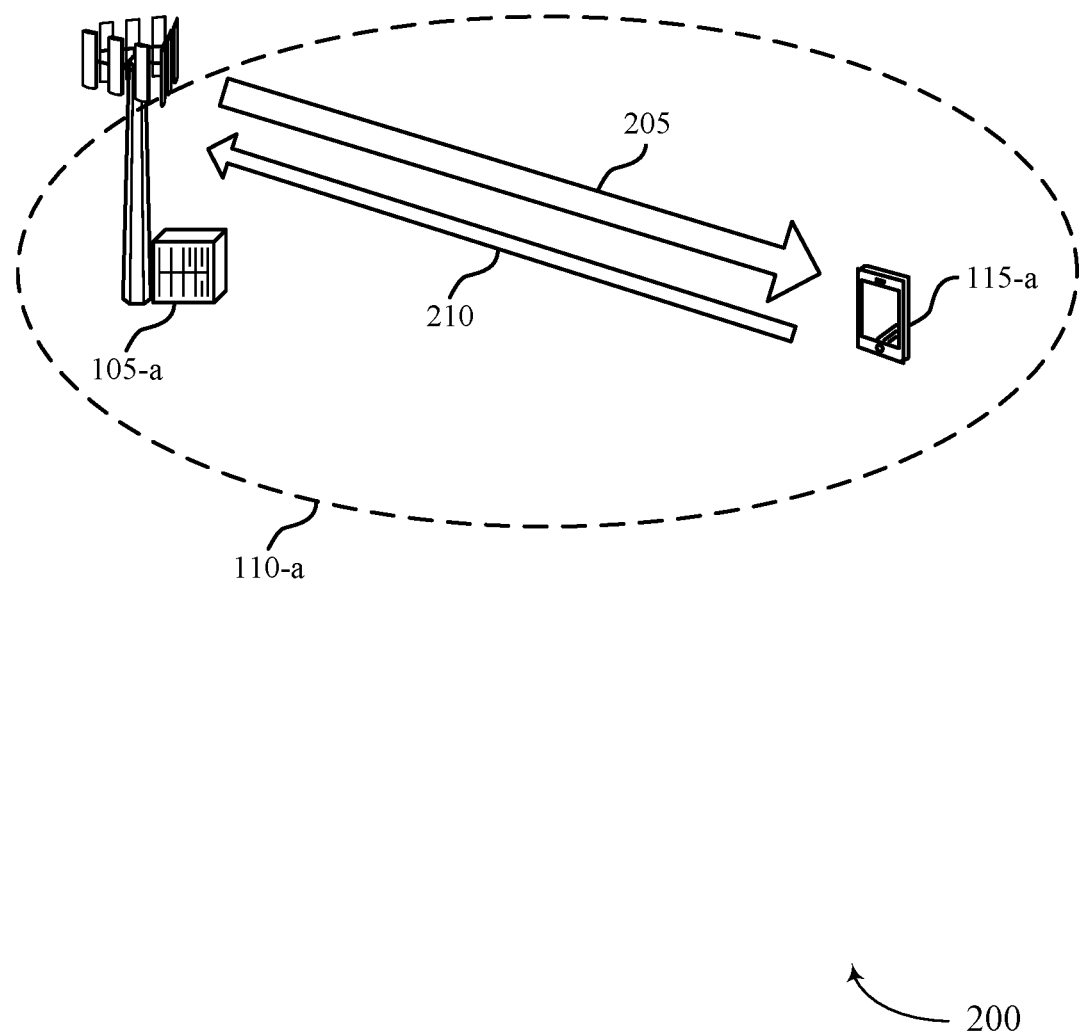
FIG. 2 illustrates an example of a wireless communication subsystem in accordance with various aspects of the present disclosure.

FIG. 2 illustrates an example of a wireless communications subsystem 200 in accordance with various aspects of the present disclosure. In some examples, the wireless communications subsystem 200 may include a mobile services network. In some cases, wireless communications subsystem 200 may coexist with a fixed services network.

As illustrated, wireless communications subsystem 200 may include UE 115-a and base station 105-a, which may be examples of a UE 115 or a base station 105, as described above with reference to FIG. 1. Wireless communications subsystem 200 may also include downlink 205 and uplink 210. Base station 105-a may use downlink 205 to convey control and/or data information to UE 115-a. And UE 115-a may use uplink 210 to convey control and/or data information to base station 105-a. In some cases, downlink 205 may use different time and/or frequency resources than uplink 210.

In some examples, a mobile services device (e.g., UE 115-a or base station 105-a) may include one or more beamforming codebooks (e.g., one or more analog beamforming codebooks for every band configured for transmissions or receptions). A beamforming codebook may provide directional analog beamforming weights that provide up to full spherical coverage. Full spherical coverage corresponds to the UE's capability to receive or transmit via distinct spatial clusters in distinct directions over the entire sphere around the UE. Full spherical coverage allows the UE to establish a communication link with any base station in any cell, independent of its directional orientation or location or path trajectory. Lack of full spherical coverage (also known as partial spherical coverage) can lead to diminished beamforming performance as some direction(s) over the sphere are left uncovered or unavailable for establishing communications links. Partial spherical coverage could be necessitated by the presence of spatial blockers (e.g., self-blockage in the form of hand, human body, etc. or other blockers such as foliage, buildings, other humans, vehicles, etc. blocking a signal). In contrast to LTE or sub-6 GHz bands, blockage is more common at millimeter wave bands due to the smaller wavelengths. In some cases, the mobile services device may obtain the beamforming codebook from an internal device-level implementation. In some case, the codebook may also be obtained from a server or from a base station (e.g., in response to querying the server, querying the base station, etc.). In some cases, UE 115-*a* may obtain a beamforming codebook in response to querying base station 105-*a*.

In some examples, the mobile services device may scan one or more beams listed in the one or more beamforming codebooks. In some cases, UE 115-*a* may attempt to detect energy (e.g., an energy estimate) from one or more scanned beams representing whether there currently is transmission within a fixed services network within a particular frequency band or bands along a set of directions. In some cases, UE 115-*a* may update its configuration to avoid transmissions that would interfere with the one or more detected beams. In some cases, UE 115-*a* may delay using a detected beam or using a frequency band of a detected beam for a set period of time. In some cases, UE 115-*a* may communicate with base station 105-*a* (e.g., via downlink 205 and uplink 210), including sending information to base station 105-*a* regarding the detected beams to base station 105-*a*. After receiving the information regarding the detected beams, base station 105-*a* may update its configuration to avoid transmissions that would interfere with the one or more detected beams. In some cases, after receiving the information regarding the detected beams, base station 105-*a* may communicate with UE 115-*a* (e.g., via downlink 205 and uplink 210), instructing UE 115-*a* to update a configuration of UE 115-*a* to avoid transmissions that would interfere with the one or more detected beams.

Figure 3:
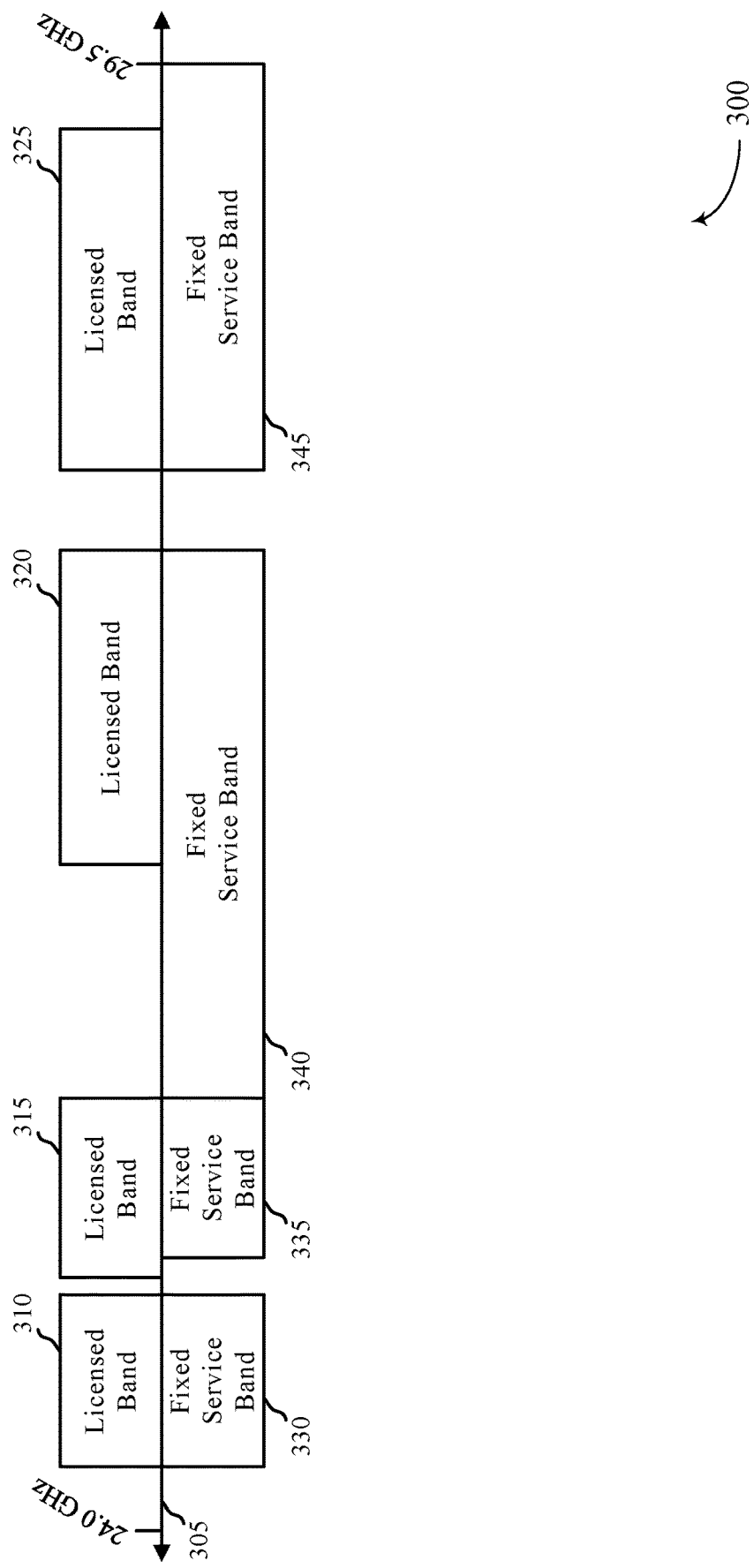
FIG. 3 illustrates an example of a diagram of a millimeter wave spectrum in accordance with aspects of the present disclosure.

FIG. 3 illustrates an example of a diagram of a spectrum 300 associated with beam-based detection for interference mitigation in accordance with aspects of the present disclosure. In some examples, spectrum 300 may implement aspects of wireless communication system 100 or wireless communications subsystem 200.

As illustrated, spectrum 300 may include a spectrum of frequency bands (e.g., a millimeter wave spectrum from 24 Gigahertz (GHz) to 29.5 GHz in the illustrated example, FR2 that includes 24-52.6 GHz, or the like). In some cases, the illustrated spectrum 300 may include multiple licensed bands and multiple fixed service bands. The licensed bands may include licensed band 310, licensed band 315, licensed band 320, and licensed band 325. The fixed service bands may include fixed service band 330, fixed service band 335, fixed service band 340, and fixed service band 345.

In the illustrated example, licensed bands for mobile services in some geographic area may include a mobile service band from 24.25 GHz to 24.45 GHz (e.g., licensed band 310), a mobile service band from 24.75 GHz to 25.25 GHz (e.g., licensed band 315), a mobile service band from 25.5 GHz to 27 GHz (e.g., licensed band 320), and a mobile service band from 27.5 GHz to 28.35 GHz (e.g., licensed band 325), etc. In the illustrated example, fixed service bands in the geographic area may include a fixed service band from 24.25 GHz to 24.45 GHz (e.g., fixed service band 330), a fixed service band from 25.05 GHz to 25.25 GHz (e.g., fixed service band 335), a fixed service band from 25.25 GHz to 27 GHz (e.g., fixed service band 340), and a fixed service band from 27.5 GHz to 29.5 GHz (e.g., fixed service band 345), etc. As shown in the illustrated example, some of the fixed service bands are shared with mobile service bands. Thus, interference may occur when a mobile service device transmits in a band currently being used by a fixed service device.

In some geographic areas, a frequency band for fixed services may be assigned as a paired band with the Tx/Rx separation fixed at 1,008 MHz. In the case of existing block assignment in geographic areas, a mobile services frequency block assigned to an operator in the 26 GHz band may be assumed to be at least 200 MHz wide or more. As a consequence, portions of a fixed services band within spectrum 300 (e.g., either in the "Go" or "Return" channel blocks) may overlap with a mobile services spectrum block assigned to a mobile services operator.

In some examples, mobile services operating within spectrum 300 may differ from previous approaches (e.g., those used in sub-6 GHz spectrum allocations) in one or more ways. For example, the mobile services may use sparser channels with a smaller number of dominant clusters. Additionally, the mobile services may use smaller wavelengths with more antennas packed within a given aperture, resulting in smaller beamwidths and directional signaling. In some cases, the present techniques use the directional nature of signaling in the millimeter wave band for interference detection.

In some cases, a wireless device (e.g., a UE operating within spectrum 300) may use a beamforming codebook designed for spherical coverage properties, where relatively good signal to noise ratio (SNR) performance is realized irrespective of the direction in which dominant clusters are observed by the wireless device, whether the wireless device is attached to a fixed services network or to a mobile services network. In some cases, beamforming codebooks used by the wireless device may be robust over the millimeter wave band (e.g., from 24 GHz to 52 GHz, etc.). In some examples, the same analog codebooks may be reused in different mobile service networks and/or different fixed service networks for SNR detection without significant loss in performance.

It is noted that the present techniques differ in multiple ways over previous interference mitigation schemes. For example, the present techniques differ from the process of a UE searching for neighbor cells. For example, in a typical neighbor cell search, a UE detects primary synchronization signals (PSS) and/or secondary synchronization signals (SSS) of neighbor cells for either handover or base-station cooperation reasons. With UEs searching for neighbor cells, the detection algorithm is constructed due to knowledge of structure of PSS/SSS symbols. In some cases, PSS may be used for synchronization and PSS/SSS may be used for physical cell ID computation. The UE searching for neighbor cells uses the fact that the structure of PSS/SSS symbols are known (e.g., Zadoff-Chu sequence, m-sequence, Gold sequence, etc.) and differ (e.g., differ only) in terms of parameters used in the precise sequence which are tailored appropriately for some transmissions.

In contrast, based on the protocol used for fixed service links the frame structure may be significantly different from the frame structure for a mobile network where a UE searches for neighbor cells. For example, even if the fixed service link uses orthogonal frequency-division multiplexing (OFDM) transmissions, the Fast Fourier Transform (FFT) sizes of the two networks (fixed service network and mobile service network) may be different leading to interference from multiple subcarriers of one network on the other. Nevertheless, since each network operates at millimeter wave frequencies, the present techniques take advantage of the detectability of the beam-based transmissions from the multiple antennas of both networks. While the transmitter in the fixed services network may or may not use multiple antennas (e.g., dish antennas or Yagi antennas may be used) to allow directional transmissions at the transmitter end, multiple antennas at the UE end in both networks allow the use of beam-based detection techniques. In particular, the present techniques leverage the common beam-based protocol for SNR estimation as the beams used in mobile service networks may be reused at other or similar millimeter wave frequencies used for fixed services (e.g., with a small performance degradation). Specifically, some examples of the present techniques may use Rx beamforming to detect concurrent transmissions.

Figure 4:
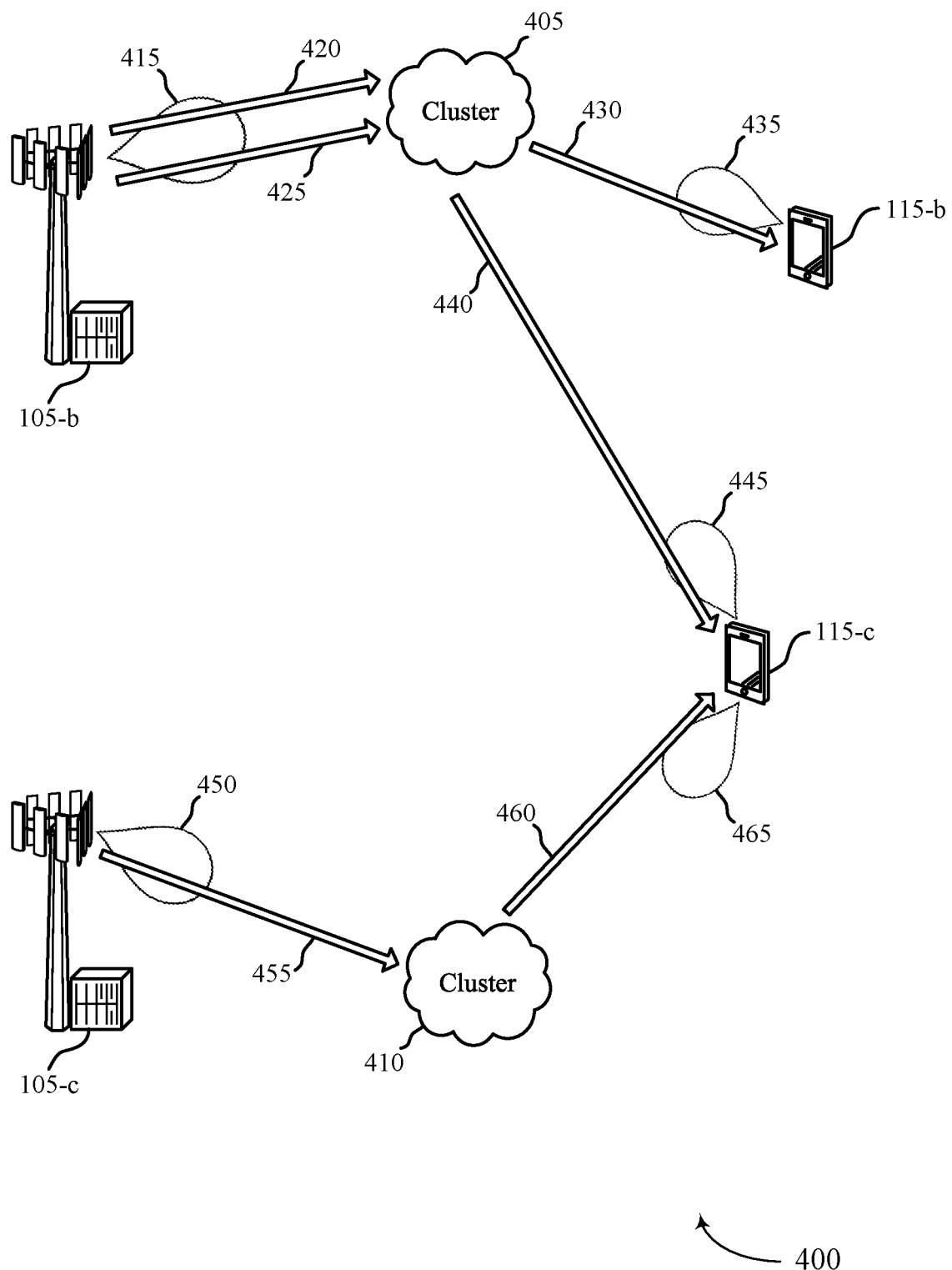
FIG. 4 illustrates an example of a wireless communication subsystem in accordance with aspects of the present disclosure.

FIG. 4 illustrates an example of a wireless communications subsystem 400 in accordance with various aspects of the present disclosure.

As illustrated, wireless communications subsystem 400 may include UE 115-b, UE 115-c, base station 105-b, and base station 105-c, which may be examples of a UE 115 or a base station 105, as described above with reference to FIG. 1 or 2. Wireless communications subsystem 400 may also include cluster 405 and cluster 410. A cluster is an object in the channel environment by which communications between the transmitter and the receiver may happen. Typical examples of clusters include reflecting objects such as lamp posts, glass window panes, metallic objects, cars, vehicles, etc. The channel environment may be characterized by the dominant clusters and a directional beam-based communication allows the focusing of energy from the transmitter to the receiver via the dominant clusters in the channel.

In one example, base station 105-b, cluster 405, and UE 115-b are part of and configured to determine a fixed services network link, while base station 105-c, cluster 410, and UE 115-c are part of and configured to determine a mobile services network link. As shown, directional beam 415 and directional beam 435 may be used to establish a link between base station 105-b and UE 115-b. In the illustrated example, transmission 420 may be sent to cluster 405 over directional beam 415, and cluster 405 may relay/reflect the transmission 420 to UE 115-b via transmission 430. As shown, UE 115-b may receive transmission 430 via directional beam 435. Also, directional beam 450 and directional beam 465 may be used to establish a link between base station 105-c and UE 115-c. In the illustrated example, transmission 455 may be sent to cluster 410 over directional beam 450, and cluster 410 may relay transmission 455 to UE 115-c via transmission 460. As shown, UE 115-c may receive transmission 460 via directional beam 465.

In some examples, UE 115-c may perform scans to detect the use of potentially-interfering transmission from a fixed services network. In some examples, UE 115-c may scan for beams associated with a mobile services network (e.g., corresponding to beams used in a fixed services network). In one example, UE 115-c may include a beamforming codebook. In some cases, the beamforming codebook may list beams used in a mobile services network. In some cases, UE 115-c may scan (e.g., scan in Rx mode) beams in a beamforming codebook stored at UE 115-c. In some examples, UE 115-c may scan for beams in an analog beamforming codebook (e.g., using a codebook meant for a mobile services network) before attaching to a mobile services network (e.g., establishing a link with base station 105-c). In some cases, UE 115-c may scan for beams in a beamforming codebook to determine the existence of transmissions in one or more bands (e.g., transmission activity in a fixed services band). In some examples, the beamforming codebook may provide the UE 115-c with up to full spherical coverage (e.g., may generate a beam pointing in any direction over a sphere or deliver at least a minimal SNR over any direction over the sphere).

In the illustrated example, UE 115-c may detect transmission 440 from cluster 405 based on a scan using beam 445. In some cases, UE 115-c may detect the presence of a transmission in a band when a SNR associated with the transmission exceeds a set threshold (e.g., SNR of a beam pair in the band exceeds the set threshold). For example, UE 115-c may determine transmission activity exists in a fixed services band associated with beam 445 after determining a SNR associated with transmission 440 exceeds a set threshold. With up to full spherical coverage made possible with the beamforming codebook, a viable link with sufficient SNR (e.g., SNR of the link satisfies a set threshold) may be established between base station 105-b of the fixed service network and UE 115-c of the mobile services network via directional beam 415 and directional beam 445. For example, transmission 425 different from transmission 420 may be sent between base station 105-b and cluster 405, and transmission 440 different from transmission 430 may be sent between cluster 405 and UE 115-c. Accordingly, UE 115-c may test the beams in its beamforming codebook for reception in one or more frequency bands used by a fixed services network and detect, on at least one of the beams (e.g., measure energy on at least one beam that satisfies a threshold), transmission activity of the fixed services network by base station 105-b.

In some cases, UE 115-c may opportunistically communicate with base station 105-c of the first wireless network using the beamforming codebook and based at least in part on the scanning. In some cases, opportunistically communicating with the second wireless device may include UE 115-c communicating with base station 105-c via a second beam of the plurality of beams that differs from the detected beam. In some cases, opportunistically communicating with the second wireless device may include UE 115-c communicating with base station 105-c via a second beam in a second frequency band that differs from a frequency band of the detected beam. In some cases, UE 115-c opportunistically communicating with base station 105-c may include UE 115-c transmitting a frequency band indicator to base station 105-c that indicates the frequency band of the detected beam, the frequency band of the second beam (e.g., to use to avoid interfering with a frequency band occupied by the fixed services network), or both. In some cases, the frequency band of the detected beam is a first contiguous or non-contiguous frequency band, and the frequency band of the second beam is a second contiguous or non-contiguous frequency band. In some cases, a peak or dominant array gain direction of the detected beam differs from a peak or dominant array gain direction of the second beam used by UE 115-c and base station 105-c.

In some cases, UE 115-c may have full or partial knowledge of waveforms used in fixed services network to improve the ability of UE 115-c in detecting the presence of transmissions in one or more bands (e.g., using coherent detection). In some cases, UE 115-c may correlate the known waveforms (e.g., for fixed services) with received signals on one more beams in one or more spectral bands. If the spectral band is allocated for fixed services, correlation determination by UE 115-c may show a peak (e.g., that exceeds a set threshold) using one or more beams and band occupancy may thus be confirmed by UE 115-c (e.g., transmission activity of the fixed services network is detected within that band on at least one beam).

In some examples, UE 115-c may assume no knowledge (e.g., non-coherent detection) of waveforms used for fixed services. With non-coherent detection, UE 115-c may estimate received energy associated with transmissions for fixed services (e.g., transmission 440). When the spectral band is allocated for fixed services, energy associated with the transmission may be relatively high (e.g., the energy crosses a set threshold) and band occupancy may thus be confirmed by UE 115-c.

In some examples, UE 115-*c* may detect transmissions for fixed services based on a mixed scheme of partial knowledge where coherent detection (e.g., full knowledge) is combined with non-coherent detection (assumption of no knowledge) in some manner. For example, UE 115-*c* may assume partial knowledge of waveforms used for fixed services (e.g., statistical information based on outdated data, a range of parameters used in generating waveforms, etc.) combined with a non-coherent determination of whether energy associated with a transmission exceeds a set threshold. Additionally or alternatively, UE 115-*c* may use geo-databases, licensed assistance, crowd sourcing, etc., to detect and confirm band occupancy.

In some examples, UE 115-*c* may use one or more detection algorithms to detect the presence of transmissions in one or more bands scanned by UE 115-*c*. In some examples, UE 115-*c* may configure or set one or more parameters of the detection algorithm to improve the detection of transmissions in the one or more bands scanned by UE 115-*c*. The mobile services network may, for example, obtain one or more transmission parameter from the fixed services network and signal the one or more transmission parameters (e.g., via DCI, RRC signaling, MAC-CE, or the like) to UE 115-*c*. The UE 115-*c* may use the one or more transmission parameters to scan for presence of fixed services network transmissions in one or more bands using one or more beams generated in accordance with the beamforming codebook. In some examples, the transmission parameter may indicate a waveform type used for transmissions in the fixed services network, and the UE 115-*c* may use the indicated waveform type to perform coherent detection.

In some examples, the parameters of the detection algorithm may include a duration over which UE 115-*c* listens in a particular direction, which determines how much energy UE 115-*c* accumulates from that particular direction. In some cases, temporal diversity may improve the ability of UE 115-*c* in detecting the presence of transmissions in one or more bands. Additionally or alternatively, parameters of the detection algorithm may include directivity (e.g., beamwidth) for detection relative to an intended directivity for communications. Additionally or alternatively, parameters of the detection algorithm may include one or more thresholds (e.g., SNR threshold, receiver power threshold, energy threshold, etc.) for detecting fixed services network activity using a beam within a codebook. For example, UE 115-*c* may compare a measured SNR of a detected beam to a preset SNR threshold and determine a beam is detected when the measured SNR of the detected beam exceeds the SNR threshold. In some examples, UE 115-*c* may determine a highest (or best) energy estimate of a received signal that exceeds a threshold when scanning using the beams (e.g., analog beams generated in accordance with the beamforming codebook). In some cases, a threshold may be determined based on coordination between a fixed services network and a mobile services network (e.g., between base station 105-*b* and base station 105-*c*). In some cases, a threshold may be set to a value determined to reduce a misdetection probability (e.g., determined by base station 105-*b* or base station 105-*c*). In some cases, a threshold may be set to a value to reduce false alarms. In some cases, setting the one or more thresholds may be indicated in accordance with one or more messages exchanged between a fixed services network and a mobile services network (e.g., between base station 105-*b* and base station 105-*c*, etc.).

In some examples, UE 115-*c* may use two or more different analog beamforming codebooks to check for transmissions. In one example, UE 115-*c* may use a different analog beamforming codebook for every band it checks for transmissions by a fixed services network. For example, each beamforming codebook may include a set of beam weights for each band possibly occupied by the fixed services network. In some examples, base station 105-*c* may designate one or more beamforming codebooks for UE 115-*c* to use to check for transmissions in one or more bands. In some cases, UE 115-*c* may load one or more codebooks from memory (e.g., mobile device management memory, radio frequency integrated circuit memory, etc.) corresponding to the one or more bands the UE 115-*c* is monitoring for transmissions by a fixed services network.

In some cases, full spherical coverage with an analog beamforming codebook may not be possible. For example, blockage due to hand/body (a hand blocking an antenna of UE 115-*c*, etc.) or low latency assumptions for initial cell acquisition (e.g., smaller codebook size or lesser number of antenna panels/modules) may result in full spherical coverage not being possible. In such scenarios, when a best-case (e.g., highest or cleanest) SNR of all beam pairs (e.g., in that band) detected when scanning using the beams of the codebook not exceeding a threshold (e.g., highest SNR measured by UE 115-*c* using any of the beams does not exceed the threshold) may not guarantee a low probability of false alarm as transmissions may be happening through directions in the coverage blockage(s) of the beamforming codebook. Accordingly, in some cases a customized or modified threshold may be determined based on coordination between a fixed services network (e.g., base station 105-*b*, cluster 405, UE 115-*b*, etc.) and a mobile services network (e.g., base station 105-*c*, cluster 410, UE 115-*c*, etc.). For example, the fixed services network may indicate to the mobile services network a minimum threshold a highest measured SNR is configured to meet using at least one of the beams of the codebook. If a highest measured SNR detected using any of the beams does not satisfy the threshold, then the UE 115-*c* determines that blockage is occurring. As such, the UE 115-*c* may determine to delay communicating with base station 105-*c* until at least one measured SNR detected using any of the beams satisfies the threshold.

Figure 5:
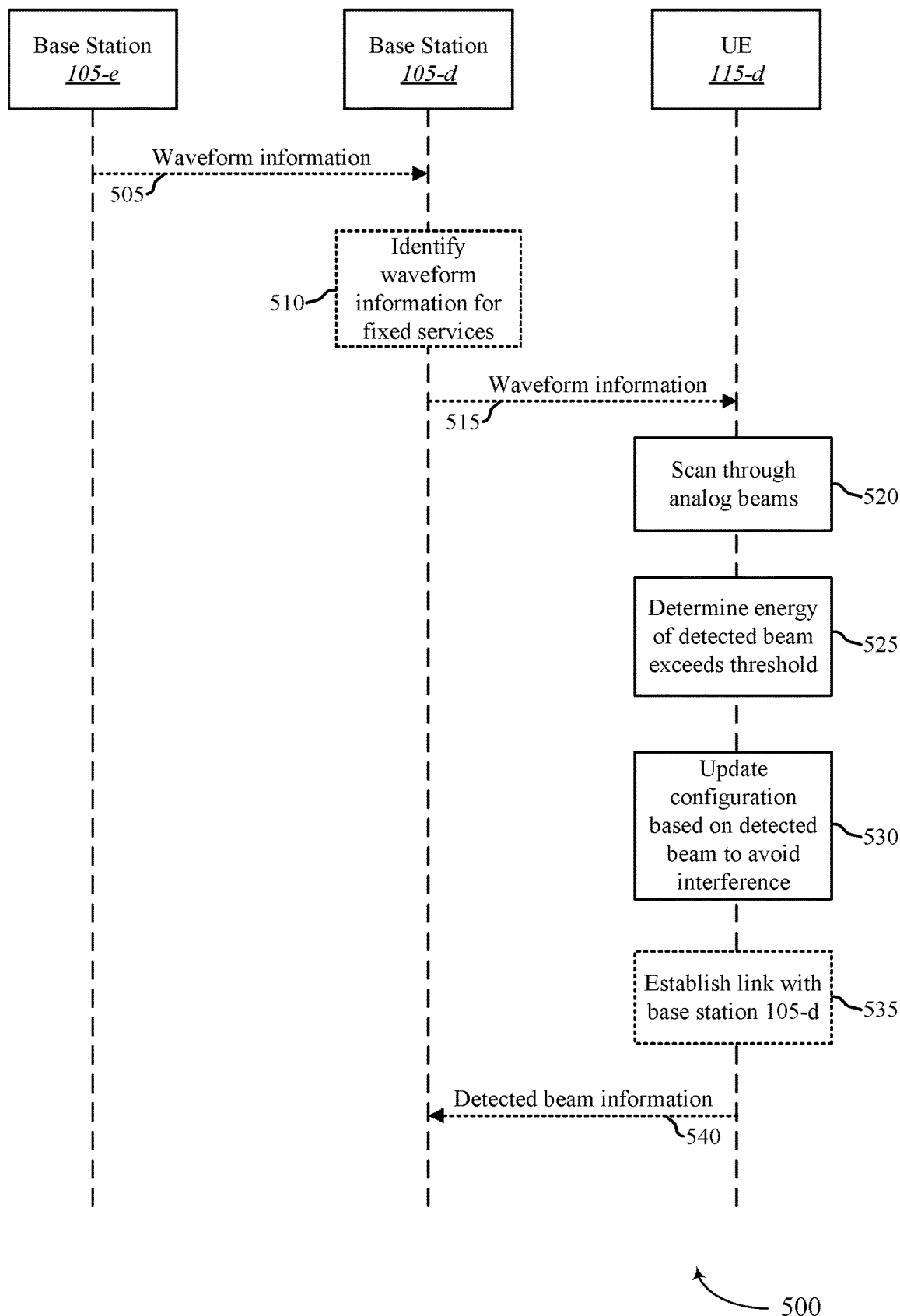
FIG. 5 illustrates an example of a diagram in accordance with aspects of the present disclosure.

FIG. 5 illustrates an example of a process 500 in accordance with aspects of the present disclosure. In some examples, process 500 may implement aspects of wireless communication system 100, wireless communications subsystem 200, or wireless communications subsystem 400.

As illustrated, process 500 may include UE 115-*d*, base station 105-*d*, and base station 105-*e*, which may be examples of a UE 115 or a base station 105, as described above with reference to FIG. 1, 2, or 4. In some examples, base station 105-*d* and UE 115-*d* are part of and configured to operate in a mobile services network, while base station 105-*e* may be part of and configured to operate in a fixed services network.

At 505, base station 105-*e* may optionally provide waveform information to base station 105-*d*. In one example, base station 105-*d* may include waveform information (e.g., the discrete or continuous time filter functions on which the symbols are modulated) and base station 105-*e* may provide base station 105-*d* with additional waveform information (e.g., waveform information associated with a fixed services network). In some cases, base station 105-*d* may detect base station 105-*e*, and based on this detection, may query base station 105-*e* for the waveform information at 505. In some cases, base station 105-*d* may transmit a parameter request to base station 105-*e* and receive (e.g., at 505) a transmission parameter from base station 105-*e* based at least in part on the parameter request.

At 510, base station 105-*d* may optionally identify waveform information for fixed services. For example, base station 105-*d* may identify waveform information based on waveform information received at 505. Alternatively, base station 105-*d* may use a beamforming codebook to scan for fixed services network communications using the beams indicated in the codebook looking for fixed services network transmission activity. In some cases, base station 105-*d* may receive (e.g., at 505) a transmission parameter from base station 105-*e* and scan, based at least in part on the transmission parameter, for transmission activity of base station 105-*e* using a plurality of beams generated in accordance with a beamforming codebook. In some cases, base station 105-*d* may opportunistically communicate with UE 115-*d* using the beamforming codebook based at least in part on this scanning.

At 515, base station 105-*d* may optionally provide waveform information to UE 115-*d*. In some cases, the waveform information at 515 may indicate fixed services network transmission activity detected by base station 105-*d* and/or fixed services network transmission activity provided to base station 105-*d* by base station 105-*e* at 505. In some cases, base station 105-*d* may configure UE 115-*d* to scan, based at least in part on the transmission parameter, for transmission activity of base station 105-*e* using a plurality of beams generated in accordance with a beamforming codebook. In some cases, base station 105-*d* may opportunistically communicate with UE 115-*d* using the beamforming codebook.

At 520, UE 115-*d* may scan through analog beams. In one example, UE 115-*d* may include one or more analog beamforming codebook and may use at least one of the beamforming codebooks to scan for fixed services network communications, scanning the beams indicated in the codebook to detect fixed services network transmission activity in one or more frequency bands. In some cases, UE 115-*d* may scan through the beams indicated in the codebook before establishing a connection with base station 105-*d*. In some examples, UE 115-*d* may scan through the beams indicated in the codebook in one or more frequency bands after establishing a connection with base station 105-*d*. In some cases, UE 115-*d* may scan through the beams indicated in the codebook before and after establishing a connection with base station 105-*d*. In some cases, UE 115-*d* may generate a plurality of beams based on the codebook. In some examples, the plurality of beams generated in accordance with the codebook may provide UE 115-*d* with spherical coverage for signal reception over channel clusters in different directions over at least a portion of an entire sphere.

At 525, UE 115-*d* may determine whether energy of a detected beam exceeds a set threshold. For example, upon detecting energy from a beam, UE 115-*d* may determine an energy level associated with the detected beam (e.g., SNR, etc.), and may compare the determined energy level to a set threshold. Upon determining the energy level of the detected beam exceeds the set threshold, UE 115-*d* may confirm that the detected beam indicates fixed services network transmission activity in one or more frequency bands. In some cases, UE 115-*d* may detect transmission activity of base station 105-*e*. In some cases, UE 115-*d* detecting transmission activity of base station 105-*e* may include UE 115-*d* detecting a master information block or a system information block of base station 105-*e* based at least in part on a transmission parameter (e.g., a transmission parameter UE 115-*d* receives from base station 105-*d* at 515, etc.). If the UE 115-*d* is able to detect the master information block or a system information block using one or more bands of its codebook in one or more frequency bands, the UE 115-*d* may detect transmission activity is presently ongoing within the one or more frequency bands. In some cases, the transmission parameter may indicate one or more thresholds, a waveform type used by base station 105-*e*, a duration over UE 115-*d* is to scan for transmission activity, a beamwidth for UE 115-*d* to use for scanning for transmission activity, or any combination thereof.

In some cases, the one or more thresholds may include a detection threshold used by UE 115-*d* to determine whether a strength of a detected beam satisfies a criteria for a detected beam. In some cases, the detection threshold may be a signal to noise ratio threshold, a signal to interference plus noise ratio, an energy threshold, or a received power threshold, or any combination thereof. In some cases, the detection threshold may be based at least in a part on a defined false alarm rate or a defined misdetection rate, or a tradeoff between false alarms and misdetections.

At 530, UE 115-*d* may update its configuration (e.g., configuration of UE 115-*d*) based on the detected fixed services network transmission activity. In one example, UE 115-*d* may update its configuration to avoid sending a transmission that UE 115-*d* determines would interfere with the detected fixed services network transmission activity. In one example, UE 115-*d* may delay using a detected beam or using a frequency band of a detected beam for a set period of time.

At 535, UE 115-*d* may optionally establish a link with base station 105-*d*. In some examples, UE 115-*d* may establish a link with base station 105-*d* before scanning through analog beams at 520, or before base station 105-*d* optionally sends waveform information at 515, or before base station 105-*d* optionally identifies waveform information for fixed services at 510, or before base station 105-*e* optionally sends waveform information to base station 105-*d* at 505. In some cases, UE 115-*d* may establish a link with base station 105-*d* and after the link is established, base station 105-*d* may send the waveform information to UE 115-*d* at 515.

In some cases, UE 115-*d* may receive (e.g., at 515) a transmission parameter associated with base station 105-*e* and scan (e.g., at 520), based at least in part on the transmission parameter, for transmission activity of base station 105-*e* using a plurality of beams generated in accordance with a beamforming codebook. In some cases, UE 115-*d* may opportunistically communicate with base station 105-*d* using the beamforming codebook based at least in part on the scanning. Opportunistically communicating may include, for example, delaying communication due to detection of ongoing transmission activity, communicating using a different beam pointed in a different direction than a beam on which ongoing transmission activity is detected, communicating using a different frequency band than a frequency band on which ongoing transmission activity is detected, any combination thereof, or the like.

At 540, UE 115-*d* may send information regarding the detected beam to base station 105-*d*. In some cases, the information regarding the detected beam received at 540 may enable base station 105-*d* to avoid sending a transmission that UE 115-*d* or base station 105-*d* determines would interfere with the detected fixed services network transmission activity. In some cases, at 540 UE 115-*d* may transmit a beam indicator to base station 105-*d* that indicates the detected beam. In some examples, at 515 base station 105-*d* may transmit a beam indicator to UE 115-*d* that indicates a detected beam and/or its direction (e.g., beam 445) or a second beam to be used for communication (e.g., beam 465). In some cases, UE 115-*d* opportunistically communicating with base station 105-*d* may include UE 115-*d* delaying communicating with base station 105-*d* based at least in part on the detected beam. In some cases, UE 115-*d* delaying communicating with base station 105-*d* may include UE 115-*d* transmitting a time-delay indicator to base station 105-*d* for indicating an amount of time to delay communication.

It is noted that while some operations are described with reference to base station 105-*d*, base station 105-*e*, and UE 115-*d*, it is understood that each operation may be performed by base station 105-*d*, or base station 105-*e*, or UE 115-*d*, or a backhaul node (e.g., an integrated access and backhaul node), or a point to point wireless device, or any device in a 5G-NR network.

Figure 6:
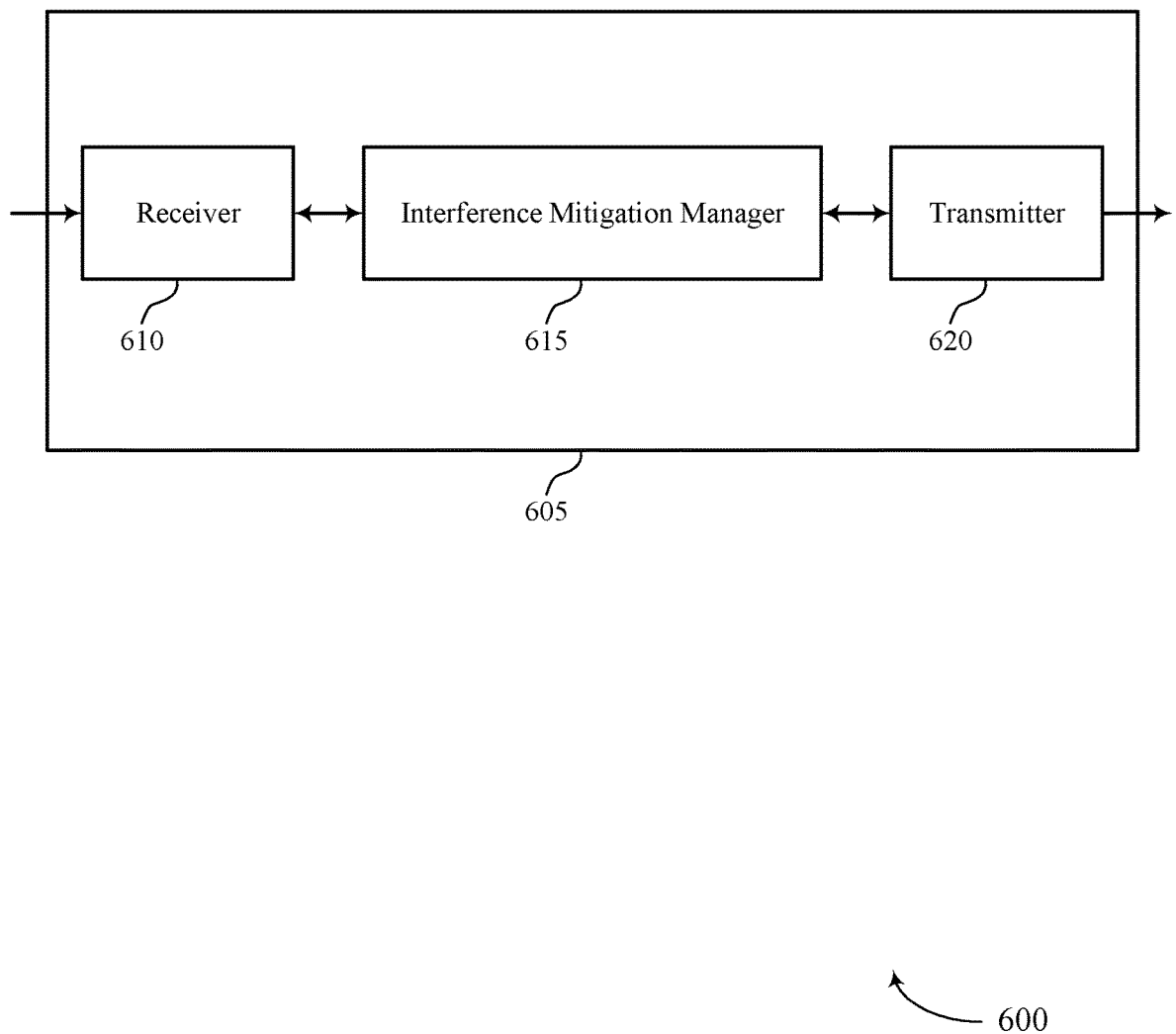
FIGS. 6 and 7 show block diagrams of devices in accordance with aspects of the present disclosure.

FIG. 6 shows a block diagram 600 of a device 605 in accordance with aspects of the present disclosure. The device 605 may be an example of aspects of a UE 115 or base station 105 as described herein. The device 605 may include a receiver 610, an interference mitigation manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to beam-based detection for interference mitigation, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The interference mitigation manager 615 may receive a transmission parameter of a second wireless network, scan, based on the transmission parameter, for transmission activity of the second wireless network using a set of beams generated in accordance with a beamforming codebook, and opportunistically communicate with a second wireless device of the first wireless network using the beamforming codebook based on the scanning. The interference mitigation manager 615 may be an example of aspects of the interference mitigation manager 910 or 1010 as described herein.

The interference mitigation manager 615, or its subcomponents, may be implemented in hardware, code (e.g., software or firmware) executed by a processor, or any combination thereof. If implemented in code executed by a processor, the functions of the interference mitigation manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The interference mitigation manager 615, or its subcomponents, may be physically located at various positions, including being distributed such that portions of functions are implemented at different physical locations by one or more physical components. In some examples, the interference mitigation manager 615, or its sub-components, may be a separate and distinct component in accordance with various aspects of the present disclosure. In some examples, the interference mitigation manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

Figure 7:
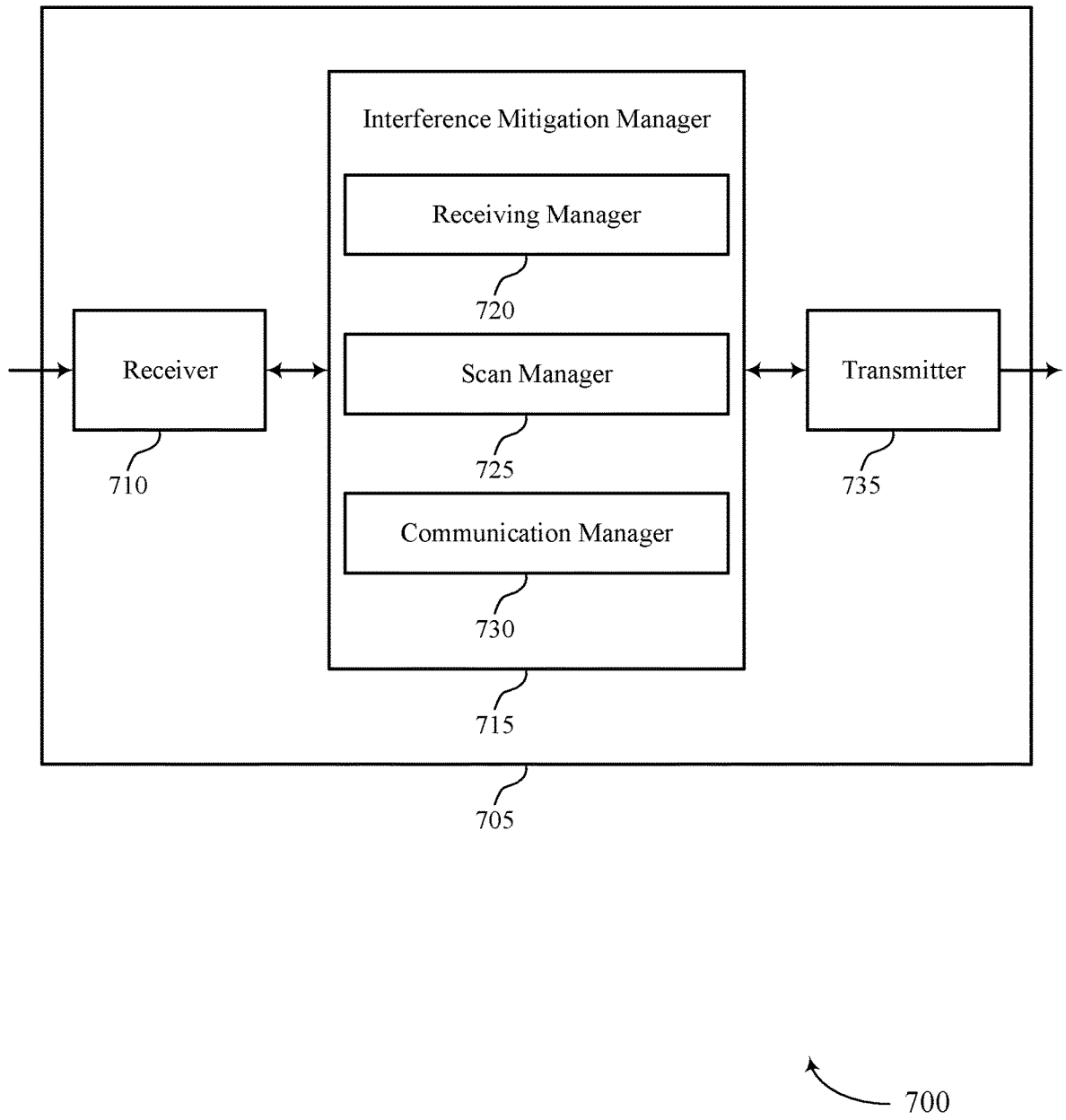

FIG. 7 shows a block diagram 700 of a device 705 in accordance with aspects of the present disclosure. The device 705 may be an example of aspects of a device 605, a UE 115, or a base station 105 as described herein. The device 705 may include a receiver 710, an interference mitigation manager 715, and a transmitter 735. The device 705 may also include a processor. Each of these components may be in communication with one another (e.g., via one or more buses).

Receiver 710 may receive information such as packets, user data, or control information associated with various information channels (e.g., control channels, data channels, and information related to beam-based detection for interference mitigation, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The interference mitigation manager 715 may be an example of aspects of the interference mitigation manager 615 as described herein. The interference mitigation manager 715 may include a receiving manager 720, a scan manager 725, and a communication manager 730. The interference mitigation manager 715 may be an example of aspects of the interference mitigation manager 910 or 1010 as described herein.

The receiving manager 720 may receive a transmission parameter of a second wireless network. The scan manager 725 may scan, based on the transmission parameter, for transmission activity of the second wireless network using a set of beams generated in accordance with a beamforming codebook. The communication manager 730 may opportunistically communicate with a second wireless device of the first wireless network using the beamforming codebook based on the scanning.

Transmitter 735 may transmit signals generated by other components of the device 705. In some examples, the transmitter 735 may be collocated with a receiver 710 in a transceiver module. For example, the transmitter 735 may be an example of aspects of the transceiver 920 or 1020 as described with reference to FIGS. 9 and 10. The transmitter 735 may utilize a single antenna or a set of antennas.

Figure 8:
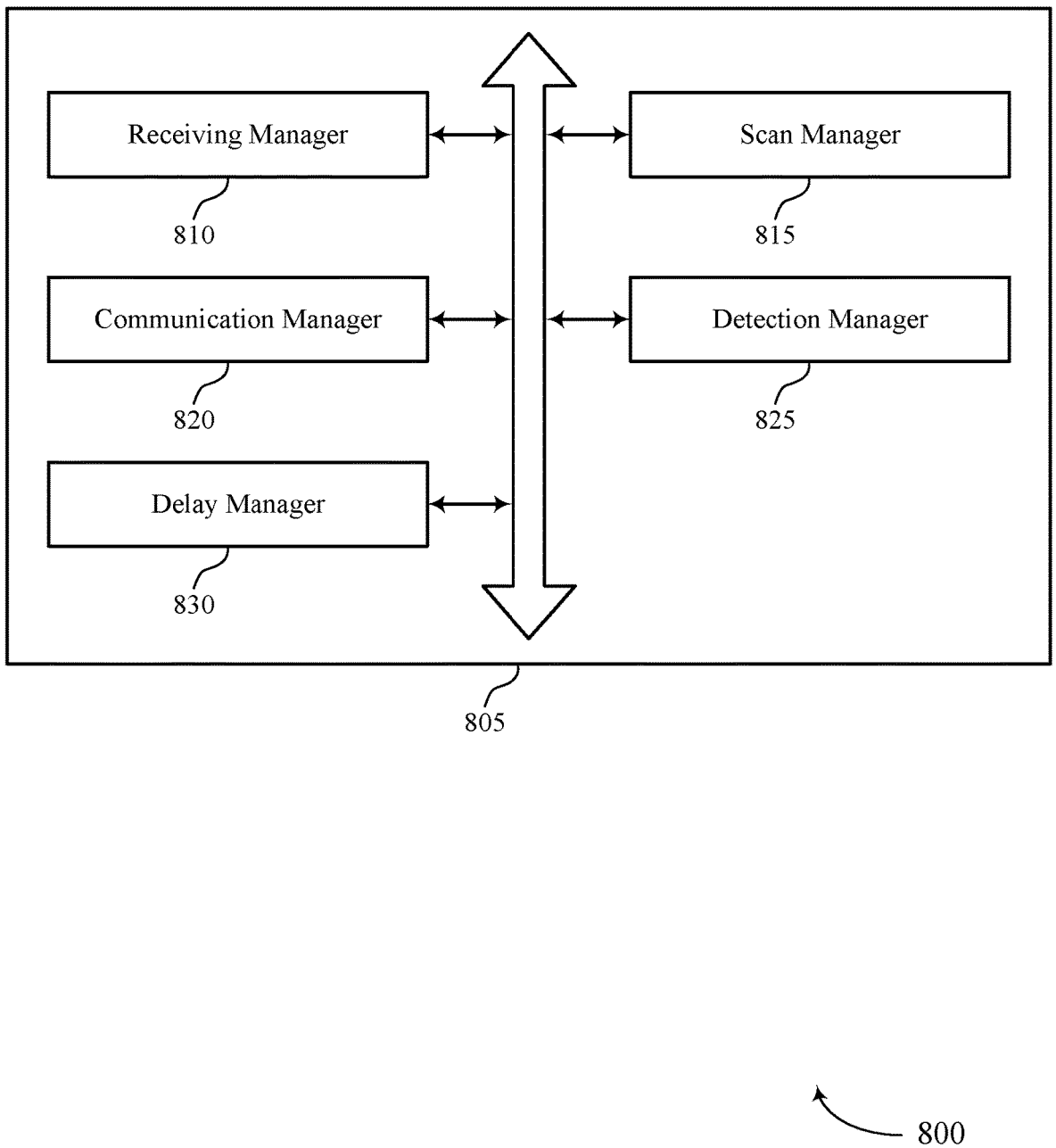
FIG. 8 shows a block diagram of an interference mitigation manager in accordance with aspects of the present disclosure.

FIG. 8 shows a block diagram 800 of an interference mitigation manager 805 in accordance with aspects of the present disclosure. The interference mitigation manager 805 may be an example of aspects of an interference mitigation manager 615, an interference mitigation manager 715, or an interference mitigation manager 910 described herein. The interference mitigation manager 805 may include a receiving manager 810, a scan manager 815, a communication manager 820, a detection manager 825, and a delay manager 830. Each of these modules may communicate, directly or indirectly, with one another (e.g., via one or more buses).

The receiving manager 810 may receive a transmission parameter of a second wireless network. The scan manager

815 may scan, based on the transmission parameter, for transmission activity of the second wireless network using a set of beams generated in accordance with a beamforming codebook. In some examples, the scan manager 815 may select a second beamforming codebook that corresponds to a second frequency band.

In some examples, the scan manager 815 may scan the second frequency band for transmission activity of the second wireless network or a third wireless network using a second set of beams generated in accordance with the second beamforming codebook. The communication manager 820 may opportunistically communicate with a second wireless device of the first wireless network using the beamforming codebook based on the scanning.

In some examples, the communication manager 820 may communicate with the second wireless device via a second beam of the set of beams that differs from the first beam. In some examples, the communication manager 820 may transmit a beam indicator that indicates the second beam to the second wireless device. In some examples, the communication manager 820 may communicate with the second wireless device via the second beam in a second frequency band that differs from the first frequency band.

In some examples, the communication manager 820 may transmit a frequency band indicator to the second wireless device that indicates the first frequency band, the second frequency band, or both. In some examples, the communication manager 820 may communicate with the second wireless device based on determining that at least one signal strength measurement generated using at least one beam of the set the beams satisfies a threshold.

The detection manager 825 may detect transmission activity of the second wireless network within a first frequency band on a first beam of the set of beams. In some examples, the detection manager 825 may detect transmission activity of the second wireless network based on determining that a signal strength measurement generated using the first beam satisfies a threshold. In some examples, the detection manager 825 may detect a fixed services link of the second wireless network based on the transmission parameter. In some examples, the detection manager 825 may detect a master information block or a system information block of the second wireless network based on the transmission parameter.

The delay manager 830 may delay communicating with the second wireless device based on the detecting. In some examples, the delay manager 830 may transmit a time-delay indicator to the second wireless device. In some examples, the delay manager 830 may delay communicating with the second wireless device based on determining that a set of signal strength measurements generated using a respective beam of the set the beams does not satisfy a threshold.

Figure 9:
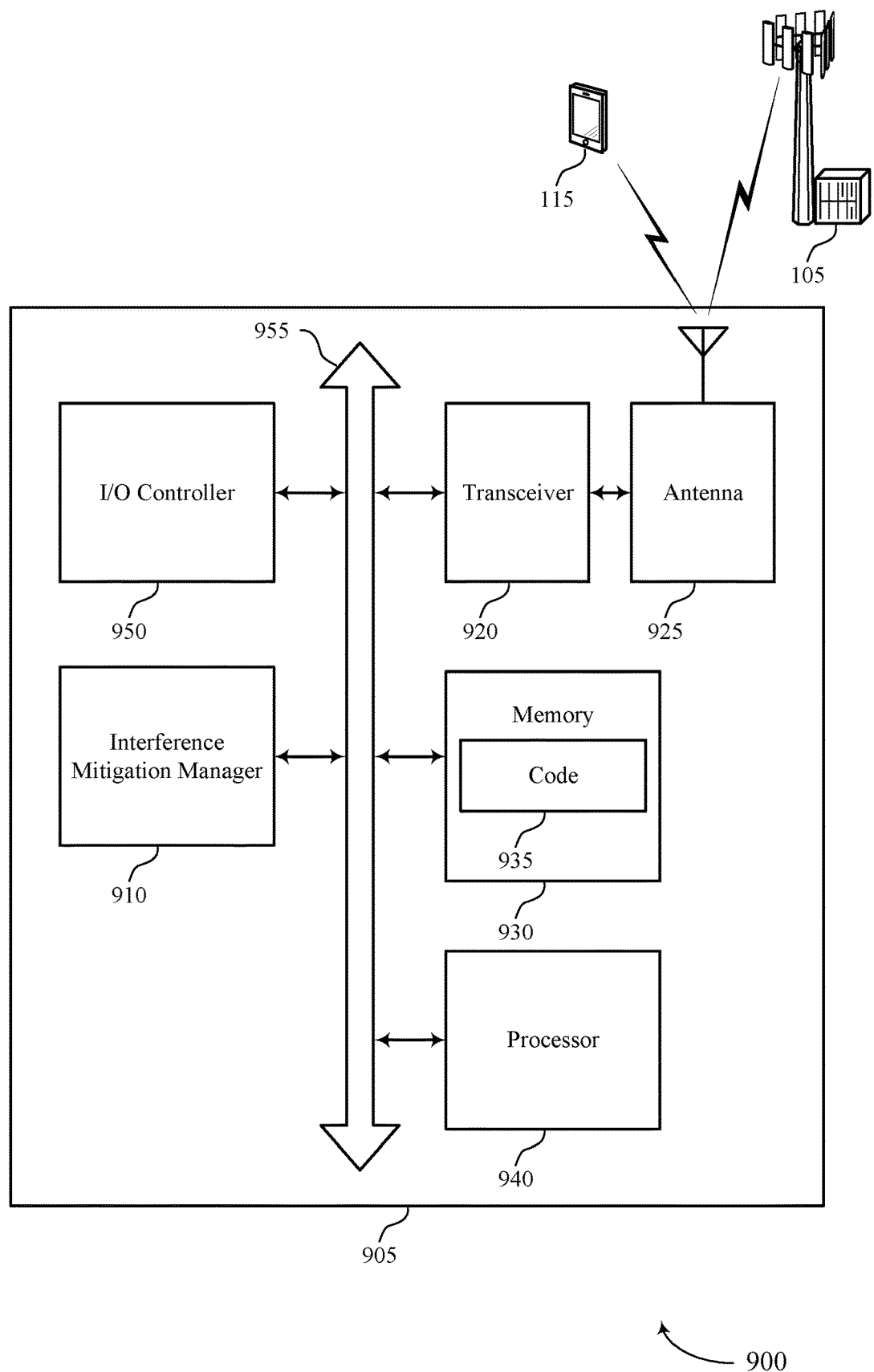
FIG. 9 shows a diagram of a system including a user equipment (UE) in accordance with aspects of the present disclosure.

FIG. 9 shows a diagram of a system 900 including a device 905 in accordance with aspects of the present disclosure. The device 905 may be an example of or include the components of device 605, device 705, or a UE 115 as described herein. The device 905 may include components for bi-directional voice and data communications including components for transmitting and receiving communications, including an interference mitigation manager 910, a transceiver 920, an antenna 925, memory 930, a processor 940, and an I/O controller 950. These components may be in electronic communication via one or more buses (e.g., bus 955).

The interference mitigation manager 910 may receive a transmission parameter of a second wireless network, scan, based on the transmission parameter, for transmission activity of the second wireless network using a set of beams generated in accordance with a beamforming codebook, and opportunistically communicate with a second wireless device of the first wireless network using the beamforming codebook based on the scanning.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam-based detection for interference mitigation).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
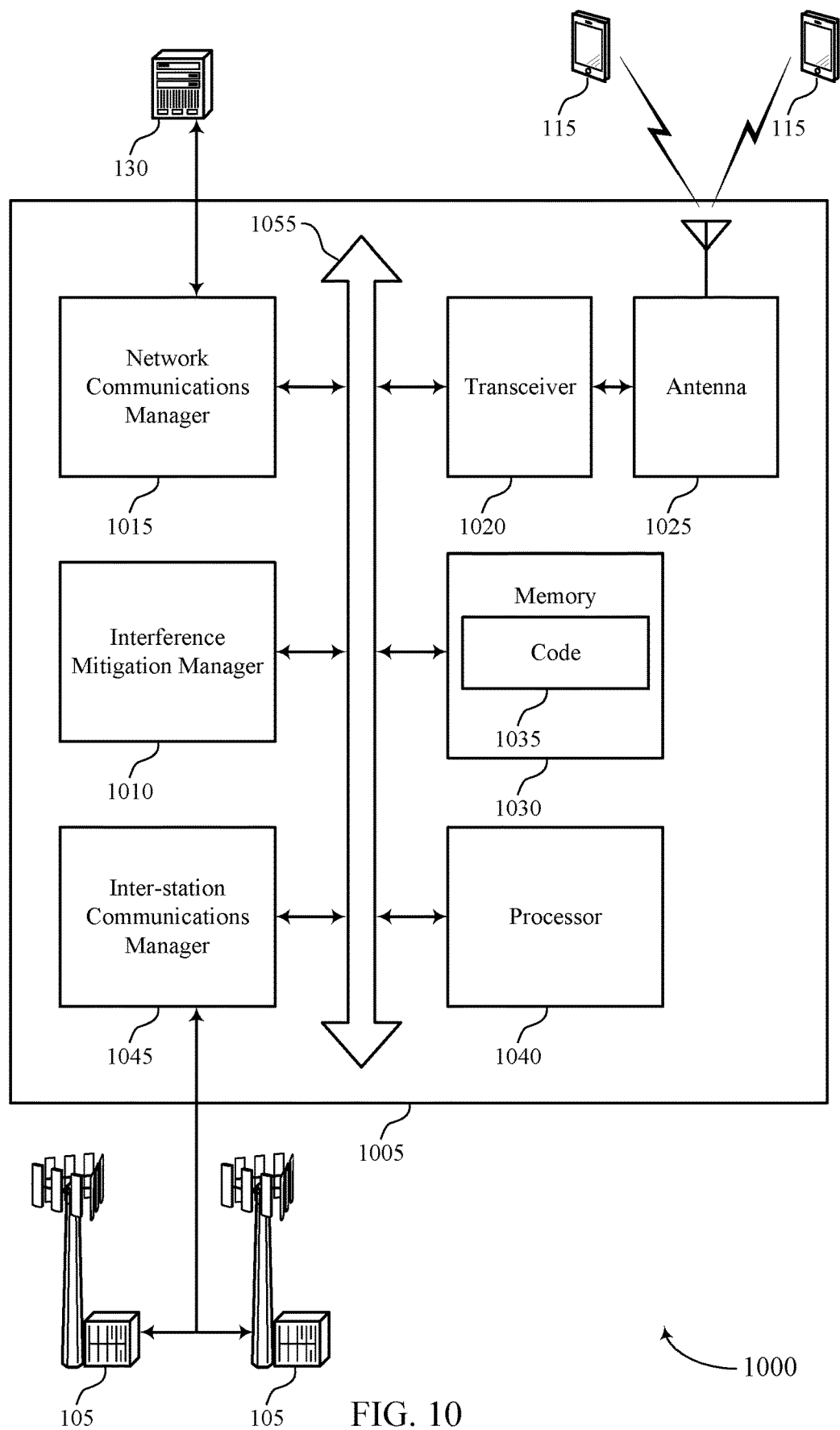
FIG. 10 shows a diagram of a system including a base station in accordance with aspects of the present disclosure.

FIG. 10 shows a diagram of a system 1000 including a device 1005 in accordance with aspects of the present disclosure. The device 1005 may be an example of or include the components of device 605, device 705, or a base station 105 as described herein. The device 1005 may include components for bi-directional voice and data communications including components for transmitting and receiving communications, including an interference mitigation manager 1010, a network communications manager 1015, a transceiver 1020, an antenna 1025, memory 1030, a processor 1040, and an inter-station communications manager 1045. These components may be in electronic communication via one or more buses (e.g., bus 1055).

The interference mitigation manager 1010 may receive a transmission parameter of a second wireless network, scan, based on the transmission parameter, for transmission activity of the second wireless network using a set of beams generated in accordance with a beamforming codebook, and opportunistically communicate with a second wireless device of the first wireless network using the beamforming codebook based on the scanning.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam-based detection for interference mitigation).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
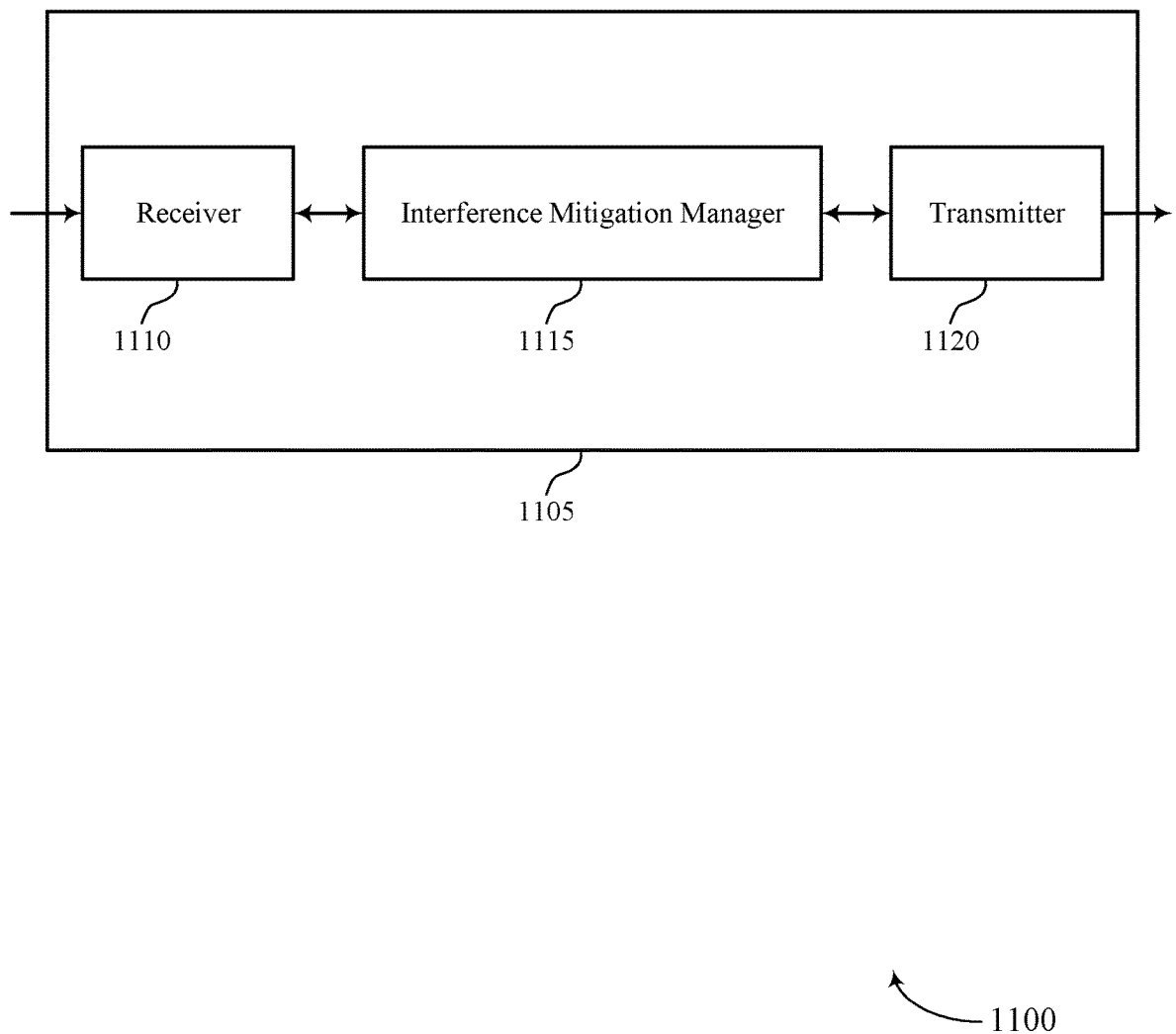
FIGS. 11 and 12 show block diagrams of devices in accordance with aspects of the present disclosure.

FIG. 11 shows a block diagram 1100 of a device 1105 in accordance with aspects of the present disclosure. The device 1105 may be an example of aspects of a base station 105 as described herein. The device 1105 may include a receiver 1110, an interference mitigation manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to beam-based detection for interference mitigation, etc.). Information may be passed on to other components of the device 1105. The receiver 1110 may be an example of aspects of the transceiver 1420 described with reference to FIG. 14. The receiver 1110 may utilize a single antenna or a set of antennas.

The interference mitigation manager 1115 may transmit a parameter request to a second wireless device of a second wireless network, receive a transmission parameter based on the parameter request, configure a UE to scan, based on the transmission parameter, for transmission activity of the second wireless network using a set of beams generated in accordance with a beamforming codebook, and opportunistically communicate with the UE using the beamforming codebook. The interference mitigation manager 1115 may be an example of aspects of the interference mitigation manager 1410 described herein.

The interference mitigation manager 1115, or its subcomponents, may be implemented in hardware, code (e.g., software or firmware) executed by a processor, or any combination thereof. If implemented in code executed by a processor, the functions of the interference mitigation manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The interference mitigation manager 1115, or its subcomponents, may be physically located at various positions, including being distributed such that portions of functions are implemented at different physical locations by one or more physical components. In some examples, the interference mitigation manager 1115, or its sub-components, may be a separate and distinct component in accordance with various aspects of the present disclosure. In some examples, the interference mitigation manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
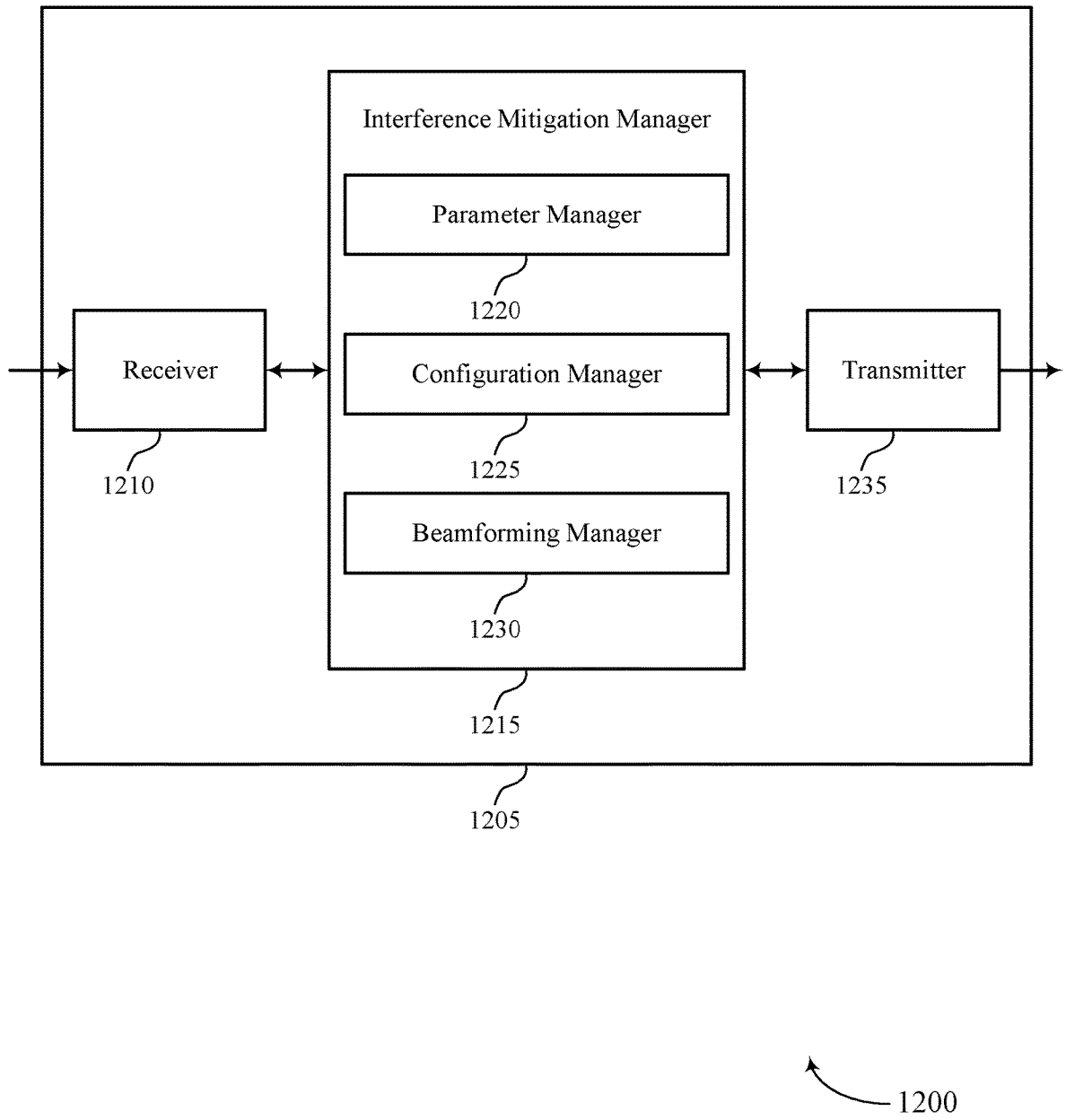

FIG. 12 shows a block diagram 1200 of a device 1205 in accordance with aspects of the present disclosure. The device 1205 may be an example of aspects of a device 1105, or a base station 105 as described herein. The device 1205 may include a receiver 1210, an interference mitigation manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to beam-based detection for interference mitigation, etc.). Information may be passed on to other components of the device 1205. The receiver 1210 may be an example of aspects of the transceiver 1420 described with reference to FIG. 14. The receiver 1210 may utilize a single antenna or a set of antennas.

The interference mitigation manager 1215 may be an example of aspects of the interference mitigation manager 1115 as described herein. The interference mitigation manager 1215 may include a parameter manager 1220, a configuration manager 1225, and a beamforming manager 1230. The interference mitigation manager 1215 may be an example of aspects of the interference mitigation manager 1410 described herein.

The parameter manager 1220 may transmit a parameter request to a second wireless device of a second wireless network and receive a transmission parameter based on the parameter request. The configuration manager 1225 may configure a UE to scan, based on the transmission parameter, for transmission activity of the second wireless network using a set of beams generated in accordance with a beamforming codebook. The beamforming manager 1230 may opportunistically communicate with the UE using the beamforming codebook.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
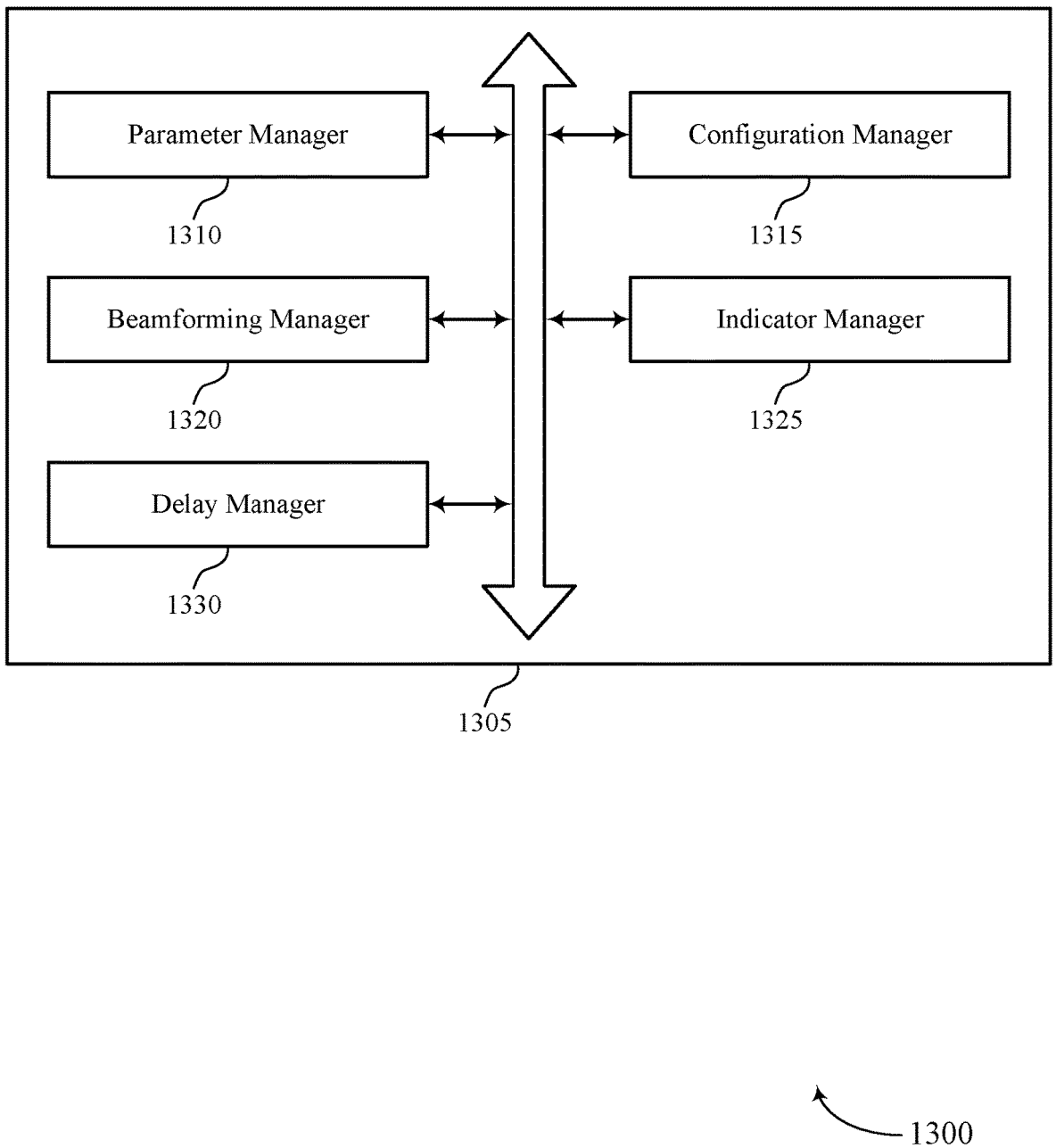
FIG. 13 shows a block diagram of an interference mitigation manager in accordance with aspects of the present disclosure.

FIG. 13 shows a block diagram 1300 of an interference mitigation manager 1305 in accordance with aspects of the present disclosure. The interference mitigation manager 1305 may be an example of aspects of an interference mitigation manager 1115, an interference mitigation manager 1215, or an interference mitigation manager 1410 described herein. The interference mitigation manager 1305 may include a parameter manager 1310, a configuration manager 1315, a beamforming manager 1320, an indicator manager 1325, and a delay manager 1330. Each of these modules may communicate, directly or indirectly, with one another (e.g., via one or more buses).

The parameter manager 1310 may transmit a parameter request to a second wireless device of a second wireless network. In some examples, the parameter manager 1310 may receive a transmission parameter based on the parameter request. The configuration manager 1315 may configure a UE to scan, based on the transmission parameter, for transmission activity of the second wireless network using a set of beams generated in accordance with a beamforming codebook.

The beamforming manager 1320 may opportunistically communicate with the UE using the beamforming codebook. In some examples, the beamforming manager 1320 may communicate with the UE using a second beam that corresponds to the first beam. In some examples, the beamforming manager 1320 may communicate with the UE based on the frequency band indicator.

The indicator manager 1325 may receive a beam indicator indicating a first beam of the set of beams has been selected by the UE. In some examples, the indicator manager 1325 may receive a frequency band indicator from the UE that indicates a first frequency band, a second frequency band, or both. In some examples, the indicator manager 1325 may receive a delay indicator from the UE. The delay manager 1330 may delay communicating with the UE based on the delay indicator.

Figure 14:
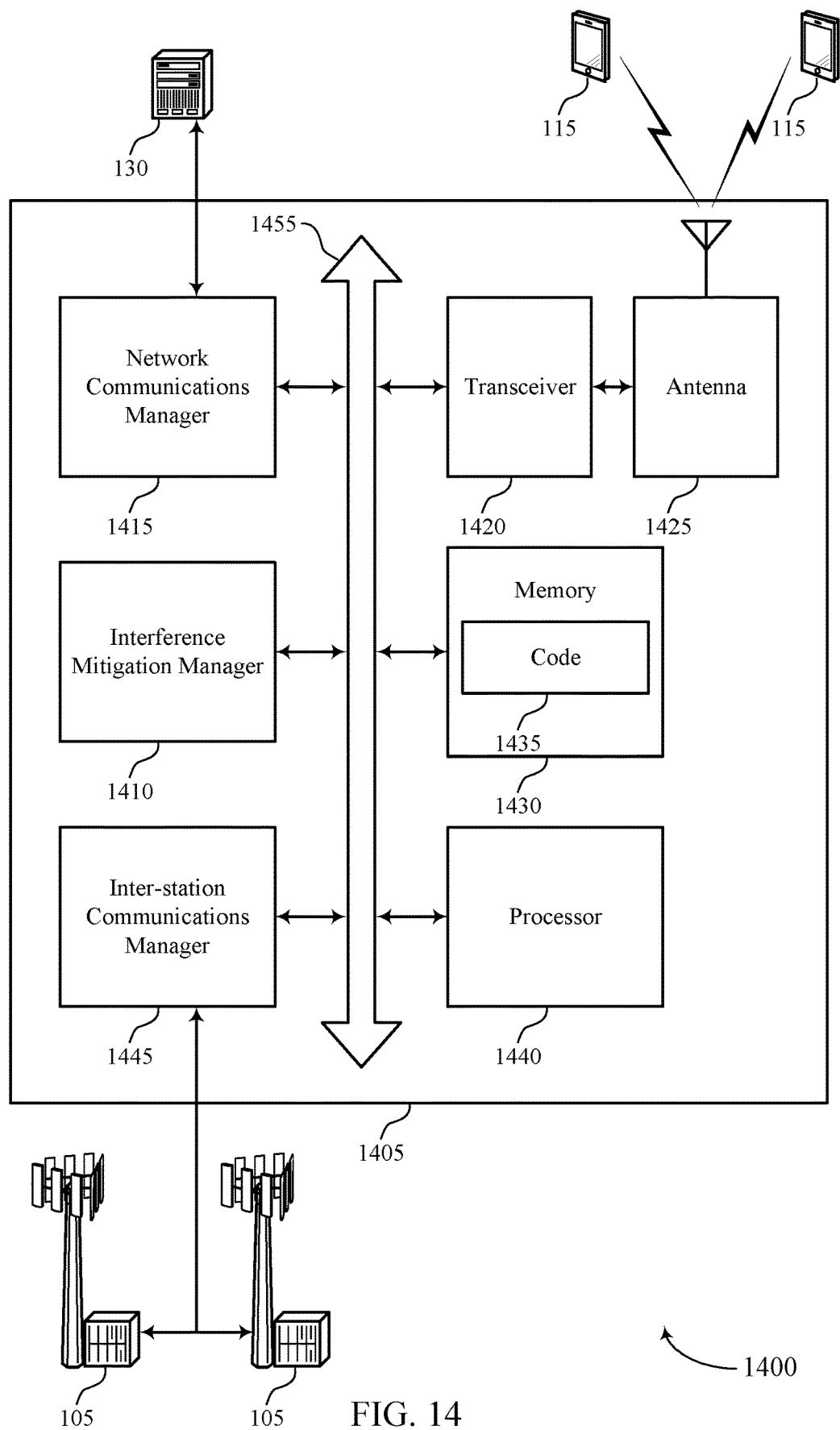
FIG. 14 shows a diagram of a system including a device in accordance with aspects of the present disclosure.

FIG. 14 shows a diagram of a system 1400 including a device 1405 in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including an interference mitigation manager 1410, a network communications manager 1415, a transceiver 1420, an antenna 1425, memory 1430, a processor 1440, and an inter-station communications manager 1445. These components may be in electronic communication via one or more buses (e.g., bus 1455).

The interference mitigation manager 1410 may transmit a parameter request to a second wireless device of a second wireless network, receive a transmission parameter based on the parameter request, configure a UE to scan, based on the transmission parameter, for transmission activity of the second wireless network using a set of beams generated in accordance with a beamforming codebook, and opportunistically communicate with the UE using the beamforming codebook.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting beam-based detection for interference mitigation).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
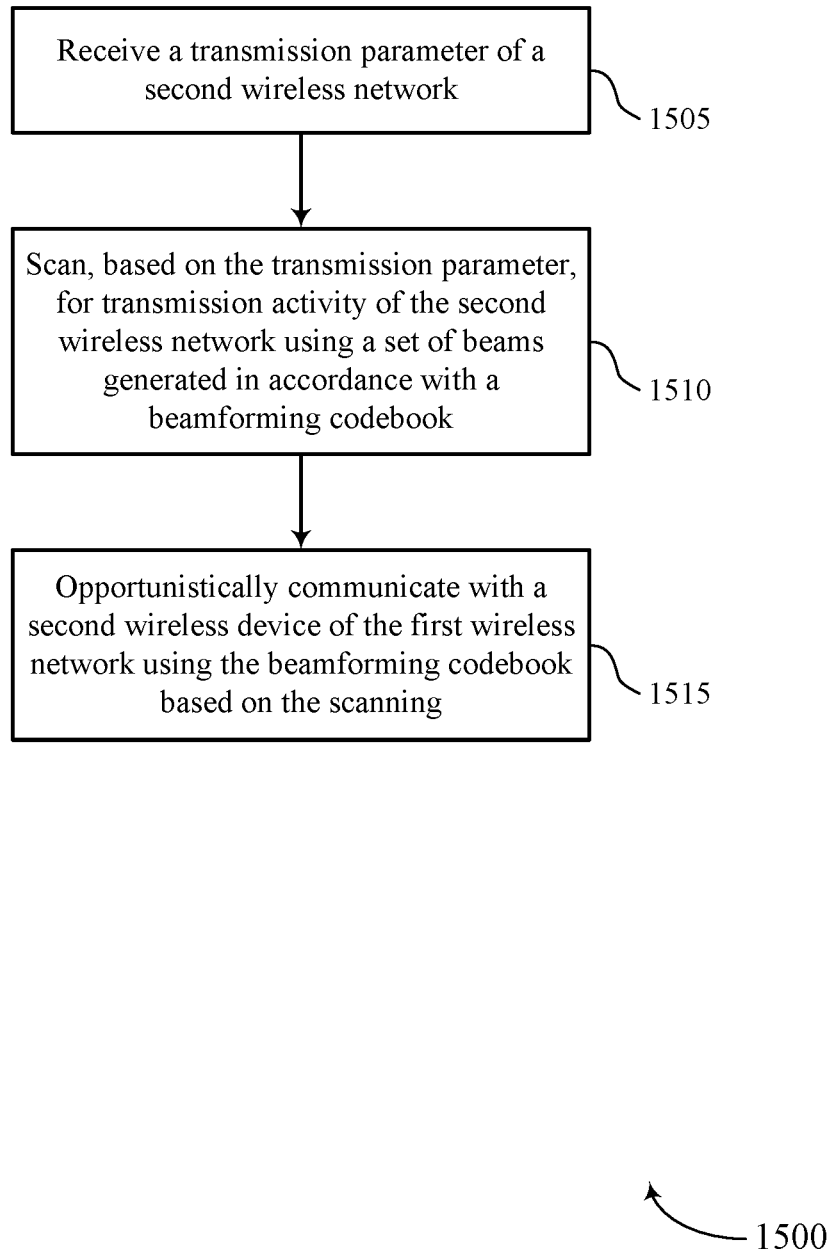
FIGS. 15 through 17 show flowcharts illustrating methods in accordance with aspects of the present disclosure.

FIG. 15 shows a flowchart illustrating a method 1500 in accordance with aspects of the present disclosure. The operations of method 1500 may be implemented by a UE 115 or base station 105 or its components as described herein. For example, the operations of method 1500 may be performed by an interference mitigation manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the UE or base station may receive a transmission parameter of a second wireless network. The operations of 1505 may be performed according to the methods described herein. In some examples, aspects of the operations of 1505 may be performed by a receiving manager as described with reference to FIGS. 6 through 10.

At 1510, the UE or base station may scan, based on the transmission parameter, for transmission activity of the second wireless network using a set of beams generated in accordance with a beamforming codebook. The operations of 1510 may be performed according to the methods described herein. In some examples, aspects of the operations of 1510 may be performed by a scan manager as described with reference to FIGS. 6 through 10.

At 1515, the UE or base station may opportunistically communicate with a second wireless device of the first wireless network using the beamforming codebook based on the scanning. The operations of 1515 may be performed according to the methods described herein. In some examples, aspects of the operations of 1515 may be performed by a communication manager as described with reference to FIGS. 6 through 10.

Figure 16:
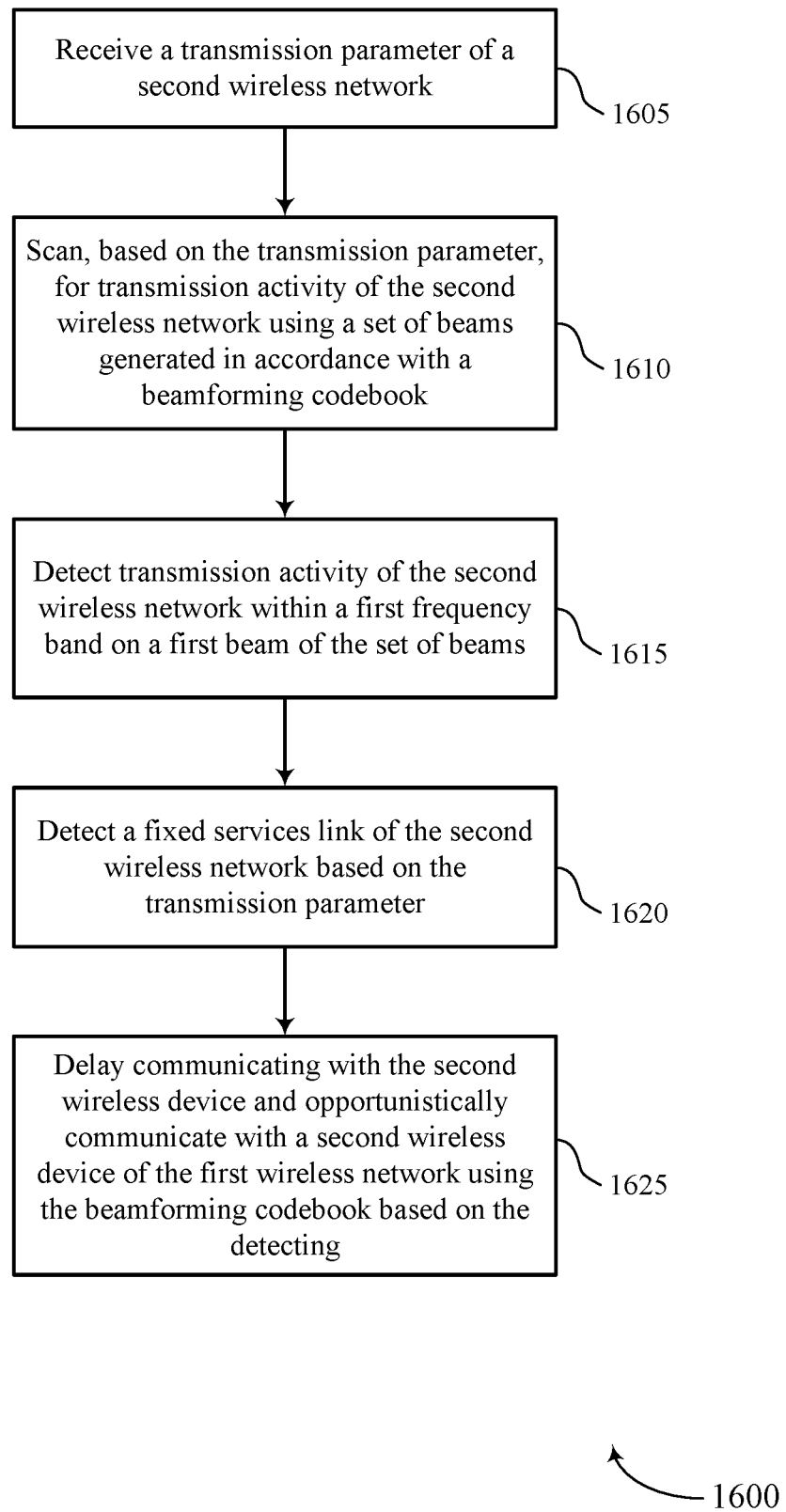

FIG. 16 shows a flowchart illustrating a method 1600 in accordance with aspects of the present disclosure. The operations of method 1600 may be implemented by a UE 115 or base station 105 or its components as described herein. For example, the operations of method 1600 may be performed by an interference mitigation manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the UE or base station may receive a transmission parameter of a second wireless network. The operations of 1605 may be performed according to the methods described herein. In some examples, aspects of the operations of 1605 may be performed by a receiving manager as described with reference to FIGS. 6 through 10.

At 1610, the UE or base station may scan, based on the transmission parameter, for transmission activity of the second wireless network using a set of beams generated in accordance with a beamforming codebook. The operations of 1610 may be performed according to the methods described herein. In some examples, aspects of the operations of 1610 may be performed by a scan manager as described with reference to FIGS. 6 through 10.

At 1615, the UE or base station may detect transmission activity of the second wireless network within a first frequency band on a first beam of the set of beams. The operations of 1615 may be performed according to the methods described herein. In some examples, aspects of the operations of 1615 may be performed by a detection manager as described with reference to FIGS. 6 through 10.

At 1620, the UE or base station may detect a fixed services link of the second wireless network based on the transmission parameter. The operations of 1620 may be performed according to the methods described herein. In some examples, aspects of the operations of 1620 may be performed by a detection manager as described with reference to FIGS. 6 through 10.

At 1625, the UE or base station may delay communicating with the second wireless device and opportunistically communicate with a second wireless device of the first wireless network using the beamforming codebook based on the detecting. The operations of 1625 may be performed according to the methods described herein. In some examples, aspects of the operations of 1625 may be performed by a delay manager as described with reference to FIGS. 6 through 10.

Figure 17:
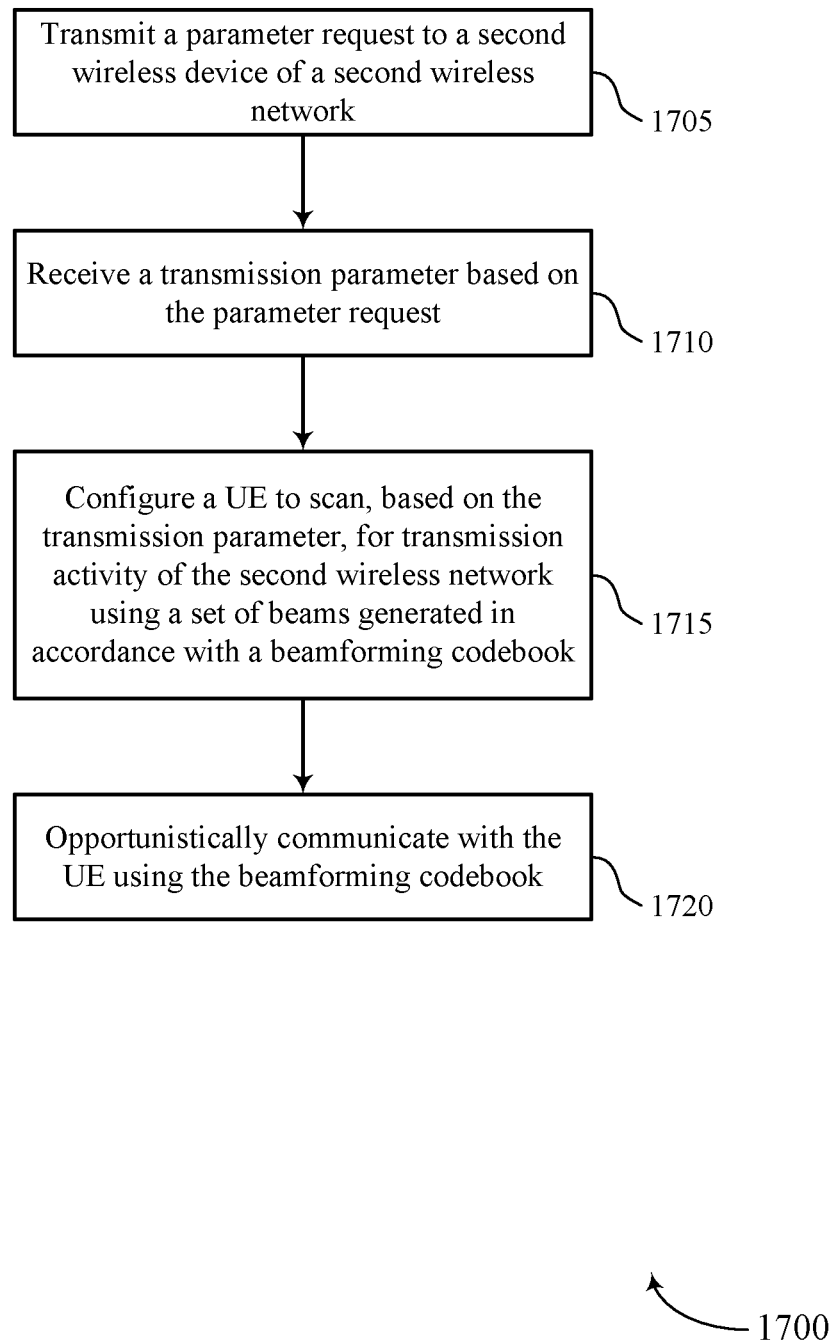

FIG. 17 shows a flowchart illustrating a method 1700 in accordance with aspects of the present disclosure. The operations of method 1700 may be implemented by a base station 105 or its components as described herein. For example, the operations of method 1700 may be performed by an interference mitigation manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may transmit a parameter request to a second wireless device of a second wireless network. The operations of 1705 may be performed according to the methods described herein. In some examples, aspects of the operations of 1705 may be performed by a parameter manager as described with reference to FIGS. 11 through 14.

At 1710, the base station may receive a transmission parameter based on the parameter request. The operations of 1710 may be performed according to the methods described herein. In some examples, aspects of the operations of 1710 may be performed by a parameter manager as described with reference to FIGS. 11 through 14.

At 1715, the base station may configure a UE to scan, based on the transmission parameter, for transmission activity of the second wireless network using a set of beams generated in accordance with a beamforming codebook. The operations of 1715 may be performed according to the methods described herein. In some examples, aspects of the operations of 1715 may be performed by a configuration manager as described with reference to FIGS. 11 through 14.

At 1720, the base station may opportunistically communicate with the UE using the beamforming codebook. The operations of 1720 may be performed according to the methods described herein. In some examples, aspects of the operations of 1720 may be performed by a beamforming manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first wireless device of a first wireless network, comprising:
    receiving a transmission parameter of a second wireless network;
    scanning, based at least in part on the transmission parameter, for transmission activity of the second wireless network using a first plurality of beams generated in accordance with a first beamforming codebook corresponding to a first frequency band and for transmission activity of the second wireless network or a third wireless network using a second plurality of beams generated in accordance with a second beamforming codebook corresponding to a second frequency band; and
    opportunistically communicating with a second wireless device of the first wireless network using the first beamforming codebook or the second beamforming codebook based at least in part on a result of the scanning.

2. The method for wireless communication of claim 1, wherein scanning for transmission activity of the second wireless network further comprises:
    detecting transmission activity of the second wireless network within the first frequency band on a first beam of the first plurality of beams.

3. The method of claim 2, wherein detecting the transmission activity of the second wireless network further comprises:
    detecting transmission activity of the second wireless network based at least in part on determining that a signal strength measurement generated using the first beam satisfies a threshold.

4. The method of claim 2, wherein opportunistically communicating with the second wireless device further comprises:
    communicating with the second wireless device via a second beam of the first plurality of beams or the second plurality of beams that differs from the first beam.

5. The method of claim 4, wherein opportunistically communicating with the second wireless device further comprises:
    transmitting a beam indicator that indicates the second beam to the second wireless device.

6. The method of claim 4, wherein opportunistically communicating with the second wireless device further comprises:
    communicating with the second wireless device via the second beam in the second frequency band that differs from the first frequency band.

7. The method of claim 6, wherein opportunistically communicating with the second wireless device further comprises:
    transmitting a frequency band indicator to the second wireless device that indicates the first frequency band, the second frequency band, or both.

8. The method of claim 6, wherein the first frequency band is a first contiguous or non-contiguous frequency band, and the second frequency band is a second contiguous or non-contiguous frequency band.

9. The method of claim 4, wherein a peak or dominant array gain direction of the first beam differs from a peak or dominant array gain direction of the second beam.

10. The method of claim 2, wherein opportunistically communicating with the second wireless device further comprises:
delaying communicating with the second wireless device based at least in part on the detecting.

11. The method of claim 10, wherein delaying communicating with the second wireless device further comprises:
transmitting a time-delay indicator to the second wireless device.

12. The method of claim 2, wherein detecting the transmission activity of the second wireless network further comprises:
detecting a fixed services link of the second wireless network based at least in part on the transmission parameter.

13. The method of claim 2, wherein detecting the transmission activity of the second wireless network further comprises:
detecting a master information block or a system information block of the second wireless network based at least in part on the transmission parameter.

14. The method of claim 1, wherein the first beamforming codebook provides the first wireless device with only a partial spherical coverage, and wherein opportunistically communicating with the second wireless device further comprises:
delaying communicating with the second wireless device based at least in part on determining that a plurality of signal strength measurements generated using a respective beam of the first plurality of beams, the second plurality of beams, or both, does not satisfy a threshold.

15. The method of claim 14, wherein the transmission parameter indicates the threshold.

16. The method of claim 1, wherein the first beamforming codebook, the second beamforming codebook, or both, provide the first wireless device with a partial spherical coverage, and wherein opportunistically communicating with the second wireless device further comprises:
communicating with the second wireless device based at least in part on determining that at least one signal strength measurement generated using at least one beam of the first plurality of beams or the second plurality of beams satisfy a threshold.

17. The method of claim 1, wherein the first wireless network is a Fifth Generation New Radio (5G-NR) wireless network at millimeter wave carrier frequencies and the second wireless network is a fixed services wireless network at millimeter wave carrier frequencies.

18. The method of claim 1, wherein the transmission parameter indicates a waveform type used in the second wireless network, a duration over which to scan for transmission activity, a beamwidth to use for scanning for transmission activity, or any combination thereof.

19. The method of claim 1, wherein the transmission parameter indicates a detection threshold to use when scanning for transmission activity, and wherein the detection threshold is a signal to noise ratio threshold, a signal to interference plus noise ratio, an energy threshold, or a received power threshold.

20. A method for wireless communication by a first wireless device of a first wireless network, comprising:
transmitting a parameter request to a second wireless device of a second wireless network;
receiving a transmission parameter of the second wireless network based at least in part on the parameter request;
configuring a user equipment (UE) to scan, based at least in part on the transmission parameter, for transmission activity of the second wireless network using a first plurality of beams generated in accordance with a first beamforming codebook corresponding to a first frequency band and for transmission activity of the second wireless network or a third wireless network using a second plurality of beams generated in accordance with a second beamforming codebook corresponding to a second frequency band; and
opportunistically communicating with the UE using the first beamforming codebook or the second beamforming codebook based at least in part on a result of the scanning.

21. The method of claim 20, wherein opportunistically communicating with the UE further comprises:
receiving a beam indicator indicating a first beam of the first plurality of beams or the second plurality of beams has been selected by the UE; and
communicating with the UE using a second beam that corresponds to the first beam.

22. The method of claim 20, wherein opportunistically communicating with the UE further comprises:
receiving a frequency band indicator from the UE that indicates the first frequency band, the second frequency band, or both; and
communicating with the UE based at least in part on the frequency band indicator.

23. The method of claim 22, wherein the first frequency band is a first contiguous or non-contiguous frequency band, and the second frequency band is a second contiguous or non-contiguous frequency band.

24. The method of claim 20, wherein opportunistically communicating with the UE further comprises:
receiving a delay indicator from the UE; and
delaying communicating with the UE based at least in part on the delay indicator.

25. The method of claim 20, wherein the first wireless network is a Fifth Generation New Radio (5G-NR) wireless network at millimeter wave carrier frequencies and the second wireless network is a fixed services wireless network at millimeter wave carrier frequencies.

26. The method of claim 20, wherein the transmission parameter indicates a waveform type used in the second wireless network, a duration over which to scan for transmission activity, a beamwidth to use for scanning for transmission activity, or any combination thereof.

27. The method of claim 20, wherein the transmission parameter indicates a detection threshold to use when scanning for transmission activity, and wherein the detection threshold is a signal to noise ratio threshold, a signal to interference plus noise ratio, an energy threshold, or a received power threshold.

28. An apparatus of a first wireless network, comprising:
a processor,
memory in electronic communication with the processor; and
instructions stored in the memory and executable by the processor to cause the apparatus to:
receive, via a receiver, a transmission parameter of a second wireless network;

scan, based at least in part on the transmission parameter, for transmission activity of the second wireless network using a first plurality of beams generated in accordance with a first beamforming codebook corresponding to a first frequency band and for transmission activity of the second wireless network or a third wireless network using a second plurality of beams generated in accordance with a second beamforming codebook corresponding to a second frequency band; and opportunistically communicate with a second wireless device of the first wireless network using the first beamforming codebook or the second beamforming codebook based at least in part on a result of the scan.

29. The apparatus of claim 28, wherein the instructions to detect the transmission activity are further executable by the processor to cause the apparatus to:

detect transmission activity of the second wireless network within the first frequency band on a first beam of the first plurality of beams.

30. An apparatus of a first wireless network, comprising:
a processor;
memory in electronic communication with the processor; and
instructions stored in the memory and executable by the processor to cause the apparatus to:

transmit a parameter request to a second wireless device of a second wireless network;

receive a transmission parameter of the second wireless network based at least in part on the parameter request;

configure a user equipment (UE) to scan, based at least in part on the transmission parameter, for transmission activity of the second wireless network using a first plurality of beams generated in accordance with a first beamforming codebook corresponding to a first frequency band and for transmission activity of the second wireless network or a third wireless network using a second plurality of beams generated in accordance with a second beamforming codebook corresponding to a second frequency band; and opportunistically communicate with the UE using the first beamforming codebook or the second beamforming codebook based at least in part on a result of the scanning.

* * * * *